United States Patent
Bertness

(10) Patent No.: US 7,479,763 B2
(45) Date of Patent: Jan. 20, 2009

(54) APPARATUS AND METHOD FOR COUNTERACTING SELF DISCHARGE IN A STORAGE BATTERY

(75) Inventor: Kevin I. Bertness, Batavia, IL (US)

(73) Assignee: Midtronics, Inc., Willowbrook, IL (US)

( * ) Notice: Subject to any disclaimer, the term of this patent is extended or adjusted under 35 U.S.C. 154(b) by 62 days.

(21) Appl. No.: 10/804,773

(22) Filed: Mar. 18, 2004

(65) Prior Publication Data

US 2004/0251876 A1  Dec. 16, 2004

Related U.S. Application Data

(63) Continuation-in-part of application No. 10/109,734, filed on Mar. 28, 2002, now abandoned.

(60) Provisional application No. 60/300,386, filed on Jun. 22, 2001.

(51) Int. Cl.
    *H02J 7/00* (2006.01)
(52) U.S. Cl. ................ 320/134; 320/132; 320/139
(58) Field of Classification Search ......... 320/101–104, 320/111, 136, 120, 121, 132, 134, 139, 11
    See application file for complete search history.

(56) References Cited

U.S. PATENT DOCUMENTS

| | | | |
|---|---|---|---|
| 2,000,665 A | 5/1935 | Neal | 173/324 |
| 2,514,745 A | 7/1950 | Dalzell | 171/95 |
| 3,356,936 A | 12/1967 | Smith | 324/29.5 |
| 3,562,634 A | 2/1971 | Latner | 31/4 |
| 3,593,099 A | 7/1971 | Scholl | 320/13 |
| 3,607,673 A | 9/1971 | Seyl | 204/1 |
| 3,652,341 A | 3/1972 | Halsall et al. | 136/176 |
| 3,676,770 A | 7/1972 | Sharaf et al. | 324/29.5 |
| 3,729,989 A | 5/1973 | Little | 73/133 |
| 3,750,011 A | 7/1973 | Kreps | 324/29.5 |
| 3,753,094 A | 8/1973 | Furuishi et al. | 324/29.5 |
| 3,796,124 A | 3/1974 | Crosa | 85/36 |
| 3,808,522 A | 4/1974 | Sharaf | 324/29.5 |
| 3,811,089 A | 5/1974 | Strezelewicz | 324/170 |

(Continued)

FOREIGN PATENT DOCUMENTS

DE  29 26 716 B1  1/1981

(Continued)

OTHER PUBLICATIONS

Simmple DC-DC converter Allows Use of Single Battery by Electronix Express (Nov. 10, 1998).*

(Continued)

*Primary Examiner*—Rajnikant B Patel
(74) *Attorney, Agent, or Firm*—Westman, Champlin & Kelly, P.A.

(57) ABSTRACT

A system for counteracting self-discharge in a storage battery is provided. The system includes a charge supply battery that provides a supply voltage. The system also includes a DC-DC converter circuit that has an input that electrically couples to the charge supply battery and an output that electrically couples to terminals of the storage battery. The DC-DC converter circuit provides a charging voltage at the output that has a magnitude greater than a magnitude of the supply voltage. The storage battery is a carbon battery.

95 Claims, 11 Drawing Sheets

U.S. PATENT DOCUMENTS

| | | | |
|---|---|---|---|
| 3,873,911 A | 3/1975 | Champlin | 324/29.5 |
| 3,876,931 A | 4/1975 | Godshalk | 324/29.5 |
| 3,886,443 A | 5/1975 | Miyakawa et al. | 324/29.5 |
| 3,889,248 A | 6/1975 | Ritter | 340/249 |
| 3,906,329 A | 9/1975 | Bader | 320/44 |
| 3,909,708 A | 9/1975 | Champlin | 324/29.5 |
| 3,936,744 A | 2/1976 | Perlmutter | 324/158 |
| 3,946,299 A | 3/1976 | Christianson et al. | 320/43 |
| 3,947,757 A | 3/1976 | Grube et al. | 324/28 |
| 3,969,667 A | 7/1976 | McWilliams | 324/29.5 |
| 3,979,664 A | 9/1976 | Harris | 324/17 |
| 3,984,762 A | 10/1976 | Dowgiallo, Jr. | 324/29.5 |
| 3,984,768 A | 10/1976 | Staples | 324/62 |
| 3,989,544 A | 11/1976 | Santo | 429/65 |
| 4,008,619 A | 2/1977 | Alcaide et al. | 73/398 |
| 4,023,882 A | 5/1977 | Pettersson | 339/96 |
| 4,024,953 A | 5/1977 | Nailor, III | 206/344 |
| 4,047,091 A | 9/1977 | Hutchines et al. | 363/59 |
| 4,053,824 A | 10/1977 | Dupuis et al. | 324/29.5 |
| 4,056,764 A | 11/1977 | Endo et al. | 320/3 |
| 4,070,624 A | 1/1978 | Taylor | 327/158 |
| 4,086,531 A | 4/1978 | Bernier | 324/158 |
| 4,112,351 A | 9/1978 | Back et al. | 324/16 |
| 4,114,083 A | 9/1978 | Benham et al. | 320/39 |
| 4,126,874 A | 11/1978 | Suzuki et al. | 354/60 |
| 4,160,916 A | 7/1979 | Papasideris | 307/10 |
| 4,178,546 A | 12/1979 | Hulls et al. | 324/158 |
| 4,193,025 A | 3/1980 | Frailing et al. | 324/427 |
| 4,207,611 A | 6/1980 | Gordon | 364/580 |
| 4,217,645 A | 8/1980 | Barry et al. | 364/483 |
| 4,280,457 A | 7/1981 | Bloxham | 123/198 |
| 4,297,639 A | 10/1981 | Branham | 324/429 |
| 4,315,204 A | 2/1982 | Sievers et al. | 322/28 |
| 4,316,185 A | 2/1982 | Watrous et al. | 340/636 |
| 4,322,685 A | 3/1982 | Frailing et al. | 324/429 |
| 4,351,405 A | 9/1982 | Fields et al. | 180/65 |
| 4,361,809 A | 11/1982 | Bil et al. | 324/426 |
| 4,363,407 A | 12/1982 | Barkler et al. | 209/3.3 |
| 4,369,407 A | 1/1983 | Korbell | 324/416 |
| 4,379,989 A | 4/1983 | Kurz et al. | 320/26 |
| 4,379,990 A | 4/1983 | Sievers et al. | 322/99 |
| 4,385,269 A | 5/1983 | Aspinwall et al. | 320/14 |
| 4,390,828 A | 6/1983 | Converse et al. | 320/32 |
| 4,392,101 A | 7/1983 | Saar et al. | 320/20 |
| 4,396,880 A | 8/1983 | Windebank | 320/21 |
| 4,408,157 A | 10/1983 | Beaubien | 324/62 |
| 4,412,169 A | 10/1983 | Dell 'Orto | 320/64 |
| 4,423,378 A | 12/1983 | Marino et al. | 324/427 |
| 4,423,379 A | 12/1983 | Jacobs et al. | 324/429 |
| 4,424,491 A | 1/1984 | Bobbett et al. | 324/433 |
| 4,459,548 A | 7/1984 | Lentz et al. | 324/158 |
| 4,514,694 A | 4/1985 | Finger | 324/429 |
| 4,520,353 A | 5/1985 | McAuliffe | 340/636 |
| 4,564,798 A | 1/1986 | Young | 320/6 |
| 4,620,767 A | 11/1986 | Woolf | 339/255 |
| 4,633,418 A | 12/1986 | Bishop | 364/554 |
| 4,659,977 A | 4/1987 | Kissel et al. | 320/64 |
| 4,663,580 A | 5/1987 | Wortman | 320/35 |
| 4,665,370 A | 5/1987 | Holland | 324/429 |
| 4,667,143 A | 5/1987 | Cooper et al. | 320/22 |
| 4,667,279 A | 5/1987 | Maier | 363/46 |
| 4,678,998 A | 7/1987 | Muramatsu | 324/427 |
| 4,679,000 A | 7/1987 | Clark | 324/428 |
| 4,680,528 A | 7/1987 | Mikami et al. | 320/32 |
| 4,686,442 A | 8/1987 | Radomski | 320/17 |
| 4,697,134 A | 9/1987 | Burkum et al. | 320/48 |
| 4,707,795 A | 11/1987 | Alber et al. | 364/550 |
| 4,709,202 A | 11/1987 | Koenck et al. | 320/43 |
| 4,710,861 A | 12/1987 | Kanner | 363/46 |
| 4,719,428 A | 1/1988 | Liebermann | 324/436 |
| 4,743,855 A | 5/1988 | Randin et al. | 324/430 |
| 4,745,349 A | 5/1988 | Palanisamy et al. | 320/22 |
| 4,816,768 A | 3/1989 | Champlin | 324/428 |
| 4,820,966 A | 4/1989 | Fridman | 320/32 |
| 4,825,170 A | 4/1989 | Champlin | 324/436 |
| 4,847,547 A | 7/1989 | Eng, Jr. et al. | 320/35 |
| 4,849,700 A | 7/1989 | Morioka et al. | 324/427 |
| 4,876,495 A | 10/1989 | Palanisamy et al. | 320/18 |
| 4,881,038 A | 11/1989 | Champlin | 324/426 |
| 4,888,716 A | 12/1989 | Ueno | 364/550 |
| 4,912,416 A | 3/1990 | Champlin | 324/430 |
| 4,913,116 A | 4/1990 | Katogi et al. | 123/425 |
| 4,929,931 A | 5/1990 | McCuen | 340/636 |
| 4,931,738 A | 6/1990 | MacIntyre et al. | 324/435 |
| 4,933,845 A | 6/1990 | Hayes | 364/200 |
| 4,934,957 A | 6/1990 | Bellusci | 439/504 |
| 4,937,528 A | 6/1990 | Palanisamy | 324/430 |
| 4,947,124 A | 8/1990 | Hauser | 324/430 |
| 4,949,046 A | 8/1990 | Seyfang | 324/427 |
| 4,956,597 A | 9/1990 | Heavey et al. | 320/14 |
| 4,968,941 A | 11/1990 | Rogers | 324/428 |
| 4,968,942 A | 11/1990 | Palanisamy | 324/430 |
| 5,004,979 A | 4/1991 | Marino et al. | 324/160 |
| 5,032,825 A | 7/1991 | Xuznicki | 340/636 |
| 5,037,778 A | 8/1991 | Stark et al. | 437/216 |
| 5,047,722 A | 9/1991 | Wurst et al. | 324/430 |
| 5,087,881 A | 2/1992 | Peacock | 324/378 |
| 5,095,223 A | 3/1992 | Thomas | 307/110 |
| 5,108,320 A | 4/1992 | Kimber | 439/883 |
| 5,126,675 A | 6/1992 | Yang | 324/435 |
| 5,140,269 A | 8/1992 | Champlin | 324/433 |
| 5,144,218 A | 9/1992 | Bosscha | 320/44 |
| 5,144,248 A | 9/1992 | Alexandres et al. | 324/428 |
| 5,159,272 A | 10/1992 | Rao et al. | 324/429 |
| 5,160,881 A | 11/1992 | Schramm et al. | 322/7 |
| 5,170,124 A | 12/1992 | Blair et al. | 324/434 |
| 5,179,335 A | 1/1993 | Nor | 320/21 |
| 5,194,799 A * | 3/1993 | Tomantschger | 320/103 |
| 5,204,611 A | 4/1993 | Nor et al. | 320/21 |
| 5,214,370 A | 5/1993 | Harm et al. | 320/35 |
| 5,214,385 A | 5/1993 | Gabriel et al. | 324/434 |
| 5,241,275 A | 8/1993 | Fang | 324/430 |
| 5,254,952 A | 10/1993 | Salley et al. | 324/429 |
| 5,266,880 A | 11/1993 | Newland | 320/14 |
| 5,281,919 A | 1/1994 | Palanisamy | 324/427 |
| 5,281,920 A | 1/1994 | Wurst | 324/430 |
| 5,295,078 A | 3/1994 | Stich et al. | 364/483 |
| 5,298,797 A | 3/1994 | Redl | 307/246 |
| 5,300,874 A | 4/1994 | Shimamoto et al. | 320/15 |
| 5,302,902 A | 4/1994 | Groehl | 324/434 |
| 5,313,152 A | 5/1994 | Wozniak et al. | 320/118 |
| 5,315,287 A | 5/1994 | Sol | 340/455 |
| 5,321,626 A | 6/1994 | Palladino | 364/483 |
| 5,321,627 A | 6/1994 | Reher | 364/483 |
| 5,323,337 A | 6/1994 | Wilson et al. | 364/574 |
| 5,325,041 A | 6/1994 | Briggs | 320/44 |
| 5,331,268 A | 7/1994 | Patino et al. | 320/20 |
| 5,336,993 A | 8/1994 | Thomas et al. | 324/158.1 |
| 5,338,515 A | 8/1994 | Dalla Betta et al. | 422/95 |
| 5,339,018 A | 8/1994 | Brokaw | 320/35 |
| 5,343,380 A | 8/1994 | Champlin | 363/46 |
| 5,347,163 A | 9/1994 | Yoshimura | 307/66 |
| 5,352,968 A | 10/1994 | Reni et al. | 320/35 |
| 5,365,160 A | 11/1994 | Leppo et al. | 320/22 |
| 5,365,453 A | 11/1994 | Startup et al. | 364/481 |
| 5,381,096 A | 1/1995 | Hirzel | 324/427 |
| 5,410,754 A | 4/1995 | Klotzbach et al. | 370/85.13 |
| 5,412,308 A | 5/1995 | Brown | 323/267 |
| 5,412,323 A | 5/1995 | Kato et al. | 324/429 |
| 5,426,371 A | 6/1995 | Salley et al. | 324/429 |
| 5,426,416 A | 6/1995 | Jefferies et al. | 340/664 |
| 5,432,426 A | 7/1995 | Yoshida | 320/20 |
| 5,434,495 A | 7/1995 | Toko | 320/44 |
| 5,435,185 A | 7/1995 | Eagan | 73/587 |

| Patent No. | Date | Inventor | Class |
|---|---|---|---|
| 5,442,274 A | 8/1995 | Tamai | 320/23 |
| 5,445,026 A | 8/1995 | Eagan | 73/591 |
| 5,449,996 A | 9/1995 | Matsumoto et al. | 320/20 |
| 5,449,997 A | 9/1995 | Gilmore et al. | 320/39 |
| 5,451,881 A | 9/1995 | Finger | 324/433 |
| 5,453,027 A | 9/1995 | Buell et al. | 439/433 |
| 5,457,377 A | 10/1995 | Jonsson | 320/5 |
| 5,469,043 A | 11/1995 | Cherng et al. | 320/31 |
| 5,485,090 A | 1/1996 | Stephens | 324/433 |
| 5,488,300 A | 1/1996 | Jamieson | 324/432 |
| 5,519,383 A | 5/1996 | De La Rosa | 340/636 |
| 5,528,148 A | 6/1996 | Rogers | 324/426 |
| 5,537,967 A | 7/1996 | Tashiro et al. | 123/792.1 |
| 5,541,489 A | 7/1996 | Dunstan | 320/2 |
| 5,546,317 A | 8/1996 | Andrieu | 364/481 |
| 5,548,273 A | 8/1996 | Nicol et al. | 340/439 |
| 5,550,485 A | 8/1996 | Falk | 324/772 |
| 5,561,380 A | 10/1996 | Sway-Tin et al. | 324/509 |
| 5,562,501 A | 10/1996 | Kinoshita et al. | 439/852 |
| 5,563,496 A | 10/1996 | McClure | 320/48 |
| 5,572,136 A | 11/1996 | Champlin | 324/426 |
| 5,574,355 A | 11/1996 | McShane et al. | 320/39 |
| 5,578,915 A | 11/1996 | Crouch, Jr. et al. | 320/48 |
| 5,583,416 A | 12/1996 | Klang | 320/22 |
| 5,585,728 A | 12/1996 | Champlin | 324/427 |
| 5,589,757 A | 12/1996 | Klang | 320/22 |
| 5,592,093 A | 1/1997 | Klingbiel | 324/426 |
| 5,592,094 A | 1/1997 | Ichikawa | 324/427 |
| 5,596,260 A | 1/1997 | Moravec et al. | 320/30 |
| 5,598,098 A | 1/1997 | Champlin | 324/430 |
| 5,602,462 A | 2/1997 | Stich et al. | 323/258 |
| 5,606,242 A | 2/1997 | Hull et al. | 320/48 |
| 5,621,298 A | 4/1997 | Harvey | 320/5 |
| 5,633,985 A | 5/1997 | Severson et al. | 395/2.76 |
| 5,637,978 A * | 6/1997 | Kellett et al. | 320/104 |
| 5,642,031 A | 6/1997 | Brotto | 320/21 |
| 5,650,937 A | 7/1997 | Bounaga | 364/483 |
| 5,652,501 A | 7/1997 | McClure et al. | 320/17 |
| 5,653,659 A | 8/1997 | Kunibe et al. | 477/111 |
| 5,654,623 A | 8/1997 | Shiga et al. | 320/48 |
| 5,656,920 A | 8/1997 | Cherng et al. | 320/31 |
| 5,675,234 A | 10/1997 | Greene | 320/15 |
| 5,677,077 A | 10/1997 | Faulk | 429/90 |
| 5,684,678 A * | 11/1997 | Barrett | 363/17 |
| 5,694,024 A * | 12/1997 | Dias et al. | 320/106 |
| 5,699,050 A | 12/1997 | Kanazawa | 340/636 |
| 5,701,089 A | 12/1997 | Perkins | 327/772 |
| 5,705,929 A | 1/1998 | Caravello et al. | 324/430 |
| 5,710,503 A | 1/1998 | Sideris et al. | 320/6 |
| 5,711,648 A | 1/1998 | Hammerslag | 414/786 |
| 5,717,336 A | 2/1998 | Basell et al. | 324/430 |
| 5,717,937 A | 2/1998 | Fritz | 395/750.01 |
| 5,739,667 A | 4/1998 | Matsuda et al. | 320/5 |
| 5,745,044 A | 4/1998 | Hyatt, Jr. et al. | 340/825.31 |
| 5,747,909 A | 5/1998 | Syverson et al. | 310/156 |
| 5,747,967 A | 5/1998 | Muljadi et al. | 320/39 |
| 5,754,417 A | 5/1998 | Nicollini | 363/60 |
| 5,757,192 A | 5/1998 | McShane et al. | 324/427 |
| 5,760,587 A | 6/1998 | Harvey | 324/434 |
| 5,772,468 A | 6/1998 | Kowalski et al. | 439/506 |
| 5,773,978 A | 6/1998 | Becker | 324/430 |
| 5,780,980 A | 7/1998 | Naito | 318/139 |
| 5,789,899 A | 8/1998 | van Phuoc et al. | 320/30 |
| 5,793,359 A | 8/1998 | Ushikubo | 345/169 |
| 5,796,239 A | 8/1998 | van Phuoc et al. | 320/107 |
| 5,808,469 A | 9/1998 | Kopera | 324/43.4 |
| 5,818,234 A | 10/1998 | McKinnon | 324/433 |
| 5,821,756 A | 10/1998 | McShane et al. | 324/430 |
| 5,821,757 A | 10/1998 | Alvarez et al. | 324/434 |
| 5,825,174 A | 10/1998 | Parker | 324/106 |
| 5,831,435 A | 11/1998 | Troy | 324/426 |
| 5,850,113 A | 12/1998 | Weimer et al. | 307/125 |
| 5,862,515 A | 1/1999 | Kobayashi et al. | 702/63 |
| 5,865,638 A | 2/1999 | Trafton | 439/288 |
| 5,872,443 A | 2/1999 | Williamson | 320/21 |
| 5,872,453 A | 2/1999 | Shimoyama et al. | 324/431 |
| 5,895,440 A | 4/1999 | Proctor et al. | 702/63 |
| 5,914,605 A | 6/1999 | Bertness | 324/430 |
| 5,927,938 A | 7/1999 | Hammerslag | 414/809 |
| 5,929,609 A | 7/1999 | Joy et al. | 322/25 |
| 5,939,855 A | 8/1999 | Proctor et al. | 320/104 |
| 5,939,861 A | 8/1999 | Joko et al. | |
| 5,945,829 A | 8/1999 | Bertness | 324/430 |
| 5,951,229 A | 9/1999 | Hammerslag | 414/398 |
| 5,961,561 A | 10/1999 | Wakefield, II | 701/29 |
| 5,961,604 A | 10/1999 | Anderson et al. | 709/229 |
| 5,969,625 A | 10/1999 | Russo | 340/636 |
| 5,978,805 A | 11/1999 | Carson | 707/10 |
| 5,982,138 A | 11/1999 | Krieger | 320/105 |
| 6,002,238 A | 12/1999 | Champlin | 320/134 |
| 6,005,759 A | 12/1999 | Hart et al. | 361/66 |
| 6,008,652 A | 12/1999 | Theofanopoulos et al. | 324/434 |
| 6,009,369 A | 12/1999 | Boisvert et al. | 701/99 |
| 6,031,354 A | 2/2000 | Wiley et al. | 320/116 |
| 6,031,368 A | 2/2000 | Klippel et al. | 324/133 |
| 6,037,751 A | 3/2000 | Klang | 320/160 |
| 6,037,777 A | 3/2000 | Champlin | 324/430 |
| 6,046,514 A | 4/2000 | Rouillard et al. | 307/77 |
| 6,051,976 A | 4/2000 | Bertness | 324/426 |
| 6,055,468 A | 4/2000 | Kaman et al. | 701/29 |
| 6,061,638 A | 5/2000 | Joyce | 702/63 |
| 6,064,372 A | 5/2000 | Kahkoska | 345/173 |
| 6,072,299 A | 6/2000 | Kurie et al. | 320/112 |
| 6,072,300 A | 6/2000 | Tsuji | 320/116 |
| 6,081,098 A | 6/2000 | Bertness et al. | 320/134 |
| 6,081,109 A | 6/2000 | Seymour et al. | 324/127 |
| 6,091,245 A | 7/2000 | Bertness | 324/426 |
| 6,094,033 A | 7/2000 | Ding et al. | 320/132 |
| 6,104,167 A | 8/2000 | Bertness et al. | 320/132 |
| 6,114,834 A | 9/2000 | Parise | 320/109 |
| 6,137,269 A | 10/2000 | Champlin | 320/150 |
| 6,140,797 A | 10/2000 | Dunn | 320/105 |
| 6,144,185 A | 11/2000 | Dougherty et al. | 320/132 |
| 6,150,793 A | 11/2000 | Lesesky et al. | 320/104 |
| 6,158,000 A | 12/2000 | Collins | 713/1 |
| 6,161,640 A | 12/2000 | Yamaguchi | 180/65.8 |
| 6,163,156 A | 12/2000 | Bertness | 324/426 |
| 6,167,349 A | 12/2000 | Alvarez | 702/63 |
| 6,172,483 B1 | 1/2001 | Champlin | 320/134 |
| 6,172,505 B1 | 1/2001 | Bertness | 324/430 |
| 6,177,737 B1 * | 1/2001 | Palfey et al. | 307/64 |
| 6,181,545 B1 | 1/2001 | Amatucci et al. | 361/502 |
| 6,211,651 B1 | 4/2001 | Nemoto | 320/133 |
| 6,222,342 B1 | 4/2001 | Eggert et al. | 320/105 |
| 6,222,369 B1 | 4/2001 | Champlin | 324/430 |
| 6,225,808 B1 | 5/2001 | Varghese et al. | 324/426 |
| 6,236,332 B1 | 5/2001 | Conkright et al. | 340/825.06 |
| 6,238,253 B1 | 5/2001 | Qualls | 439/759 |
| 6,242,887 B1 | 6/2001 | Burke | 320/104 |
| 6,249,124 B1 * | 6/2001 | Bertness | 324/426 |
| 6,250,973 B1 | 6/2001 | Lowery et al. | 439/763 |
| 6,254,438 B1 | 7/2001 | Gaunt | 439/755 |
| 6,259,170 B1 | 7/2001 | Limoge et al. | 307/10.8 |
| 6,259,254 B1 | 7/2001 | Klang | 324/427 |
| 6,262,563 B1 | 7/2001 | Champlin | 320/134 |
| 6,263,268 B1 | 7/2001 | Nathanson | 701/29 |
| 6,275,008 B1 | 8/2001 | Arai et al. | 320/132 |
| 6,294,896 B1 | 9/2001 | Champlin | 320/104 |
| 6,294,897 B1 | 9/2001 | Champlin | 320/153 |
| 6,304,087 B1 | 10/2001 | Bertness | 324/426 |
| 6,307,349 B1 | 10/2001 | Koenck et al. | 320/112 |
| 6,310,481 B2 | 10/2001 | Bertness | 324/430 |
| 6,313,607 B1 | 11/2001 | Champlin | 320/132 |
| 6,313,608 B1 | 11/2001 | Varghese et al. | 32/132 |
| 6,316,914 B1 | 11/2001 | Bertness | 320/134 |
| 6,323,650 B1 | 11/2001 | Bertness et al. | 324/426 |

| | | | |
|---|---|---|---|
| 6,329,793 B1 | 12/2001 | Bertness et al. | 320/132 |
| 6,331,762 B1 | 12/2001 | Bertness | 320/134 |
| 6,332,113 B1 | 12/2001 | Bertness | 702/63 |
| 6,346,795 B2 | 2/2002 | Haraguchi et al. | 320/136 |
| 6,347,958 B1 | 2/2002 | Tsai | 439/488 |
| 6,351,102 B1 | 2/2002 | Troy | 320/139 |
| 6,356,042 B1 | 3/2002 | Kahlon et al. | 318/138 |
| 6,359,441 B1 | 3/2002 | Bertness | 324/426 |
| 6,359,442 B1 | 3/2002 | Henningson et al. | 324/426 |
| 6,363,303 B1 | 3/2002 | Bertness | 701/29 |
| 6,384,608 B1 | 5/2002 | Namaky | 324/425 |
| 6,388,448 B1 | 5/2002 | Cervas | 324/426 |
| 6,392,414 B2 | 5/2002 | Bertness | 324/429 |
| 6,411,098 B1 | 6/2002 | Laletin | 324/436 |
| 6,417,669 B1 | 7/2002 | Champlin | 324/426 |
| 6,424,157 B1 | 7/2002 | Gollomp et al. | 324/430 |
| 6,424,158 B2 | 7/2002 | Klang | 324/433 |
| 6,441,585 B1 | 8/2002 | Bertness | 320/132 |
| 6,445,158 B1 | 9/2002 | Bertness et al. | 320/104 |
| 6,456,045 B1 | 9/2002 | Troy et al. | 320/139 |
| 6,466,025 B1 | 10/2002 | Klang | 324/429 |
| 6,466,026 B1 | 10/2002 | Champlin | 324/430 |
| 6,495,990 B2 | 12/2002 | Champlin | 320/132 |
| 6,526,361 B1 | 2/2003 | Jones et al. | 702/63 |
| 6,531,848 B1 | 3/2003 | Chitsazan et al. | 320/153 |
| 6,534,993 B2 | 3/2003 | Bertness | 324/433 |
| 6,544,078 B2 | 4/2003 | Palmisano et al. | 439/762 |
| 6,556,019 B2 | 4/2003 | Bertness | 324/426 |
| 6,566,883 B1 | 5/2003 | Vonderhaar et al. | 324/426 |
| 6,586,941 B2 | 7/2003 | Bertness et al. | 324/426 |
| 6,597,150 B1 | 7/2003 | Bertness et al. | 320/104 |
| 6,600,815 B1 | 7/2003 | Walding | 379/93.07 |
| 6,618,644 B2 | 9/2003 | Bean | 700/231 |
| 6,628,011 B2 | 9/2003 | Droppo et al. | 307/43 |
| 6,667,624 B1 | 12/2003 | Raichle et al. | 324/522 |
| 6,679,212 B2 | 1/2004 | Kelling | 123/179.28 |
| 2002/0010558 A1 | 1/2002 | Bertness et al. | 702/63 |
| 2002/0171428 A1 | 11/2002 | Bertness | 324/426 |
| 2002/0176010 A1 | 11/2002 | Wallach et al. | 348/229.1 |
| 2003/0025481 A1 | 2/2003 | Bertness | 320/155 |
| 2003/0184306 A1 | 10/2003 | Bertness et al. | 324/426 |
| 2004/0000891 A1 | 1/2004 | Raichle et al. | 320/107 |

FOREIGN PATENT DOCUMENTS

| | | |
|---|---|---|
| EP | 0 022 450 A1 | 1/1981 |
| EP | 0 637 754 A1 | 2/1995 |
| EP | 0 772 056 A1 | 5/1997 |
| FR | 2 749 397 | 12/1997 |
| GB | 2 088 159 A | 6/1982 |
| GB | 2 246 916 A | 10/1990 |
| JP | 59-17892 | 1/1984 |
| JP | 59-17893 | 1/1984 |
| JP | 59-17894 | 1/1984 |
| JP | 59017894 | 1/1984 |
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04131779 | 5/1992 |
| JP | 04372536 | 12/1992 |
| JP | 5216550 | 8/1993 |
| JP | 7-128414 | 5/1995 |
| JP | 09061505 | 3/1997 |
| JP | 10056744 | 2/1998 |
| JP | 11103503 A | 4/1999 |
| RU | 2089015 C1 | 8/1997 |
| WO | WO 93/22666 | 11/1993 |
| WO | WO 94/05069 | 3/1994 |
| WO | WO 98/04910 | 2/1998 |
| WO | WO 98/58270 | 12/1998 |
| WO | WO 99/23738 | 5/1999 |
| WO | WO 00/62049 | 10/2000 |
| WO | WO 00/67359 | 11/2000 |
| WO | WO 01/59443 | 2/2001 |
| WO | WO 01/51947 | 7/2001 |

OTHER PUBLICATIONS

Simple DC-DC converter Allows Use of Single Battery by Electronicx Express.*

"Electrochemical Impedance Spectroscopy in Battery Development and Testing", *Batteries International*, Apr. 1997, pp. 59 and 62-63.

"Determining The End of Battery Life", by S. DeBardelaben, *IEEE*, 1986, pp. 365-368.

"A Look at the Impedance of a Cell", by S. Debardelaben, *IEEE*, 1988, pp. 394-397.

"The Impedance of Electrical Storage Cells", by N.A. Hampson et al., *Journal of Applied Electrochemistry*, 1980, pp. 3-11, no date.

"A Package for Impedance/Admittance Data Analysis", by B. Boukamp, *Solid State Ionics*, 1986, pp. 136-140, no date.

"Precision of Impedance Spectroscopy Estimates of Bulk, Reaction Rate, and Diffusion Parameters", by. J. Macdonald et al., *J. Electroanal, Chem*., 1991, pp. 1-11, no date.

Internal Resistance: Harbinger of Capacity Loss in Starved Electrolyte Sealed Lead Acid Batteries, by Vaccaro, F.J. et al., *AT&T Bell Laboratories*, 1987 IEEE, Ch. 2477, pp. 128, 131.

IEEE Recommended Practice For Maintenance, Testings, and Replacement of Large Lead Storage Batteries for Generating Stations and Substations, *The Institute of Electrical and Electronics Engineers, Inc., ANSI/IEEE Std.* 450-1987, Mar. 9, 1987, pp. 7-15.

"Field and Laboratory Studies to Assess the State of Health of Valve-Regulated Lead Acid Batteries: Part I Conductance/Capacity Correlation Studies", by D. Feder et al., *IEEE*, Aug. 1992, pp. 218-233.

"Battery Impedance", by E. Willihnganz et al., *Electrical Engineering*, Sep. 1959, pp. 922-925.

"JIS Japanese Industrial Standard-Lead Acid Batteries for Automobiles", *Japanese Standards Association UDC*, 621.355.2: 629.113. 006, Nov. 1995.

"Performance of Dry Cells", by C. Hambuechen, Preprint of *Am. Electrochem. Soc.*, Apr. 18-20, 1912, paper No. 19, pp. 1-5.

"A Bridge for Measuring Storage Battery Resistance", by E. Wilihncanz, *The Electrochemical Society*, preprint 79-20, Apr. 1941, pp. 253-258.

National Semiconductor Corporation, "High Q Notch Filter", Mar. 1969, Linear Brief 5, Mar. 1969.

Burr-Brown Corporation, "Design A 60 Hz Notch Filter with the UAF42", Jan. 1994, AB-071, 1994.

National Semiconductor Corporation, "LMF90-4th-Order Elliptic Notch Filter", Dec. 1994, RRD-B30M115, Dec. 1994.

"Alligator Clips with Wire Penetrators" *J.S. Popper, Inc.* product information, downloaded from http://www.jspopper.com/, undated.

"#12: LM78S40 Simple Switcher DC to DC Converter", *ITM e-Catalog*, downloaded from http://www.pcbcafe.com, undated.

"Simple DC-DC Converts Allows Use of Single Battery", *Electronix Express*, downloaded from http://www.elexp.com/t_dc-dc.htm, undated.

"DC-DC Converter Basics", *Power Designers*, downloaded from http://www.powederdesigners.com/InforWeb.design_center/articles/DC-DC/converter.shtm, undated.

"Notification of Transmittal of The International Search Report or the Declaration", PCT/US02/29461.

"Notification of Transmittal of The International Search Report or the Declaration", PCT/US03/06577.

"Notification of Transmittal of The International Search Report or the Declaration", PCT/US03/41561.

"Notification of Transmittal of The International Search Report or the Declaration", PCT/US03/27696.

* cited by examiner

APPARATUS AND METHOD FOR COUNTERACTING SELF DISCHARGE IN A STORAGE BATTERY

CROSS REFERENCE TO RELATED APPLICATIONS

The present application is a Continuation-In-Part of U.S. patent application Ser. No. 10/109,734, filed Mar. 28, 2002 now abandoned which is based on and claims the benefit of U.S. Provisional Application No. 60/300,386, filed Jun. 22, 2001.

BACKGROUND OF THE INVENTION

The present invention relates to storage batteries. More specifically, the present invention relates to a system for counteracting self-discharge in a storage battery.

Chemical batteries which create electricity from chemical reactions have been known for many years. Such batteries are becoming increasingly important and have found uses throughout industry. These uses include automobiles, UPS systems, etc.

One of the most commonly used chemical batteries are lead acid storage batteries. A lead acid battery cell includes positive and negative lead plates of slightly different composition in a dilute sulfuric acid electrolyte. As the cell discharges, sulfur molecules from the electrolyte bond with the lead plates, releasing excess electrons. As the cell charges, excess electrons bond with sulfur compounds forcing the sulfur molecules back into the sulfuric acid solution.

When a lead acid battery is left idle for a substantial period of time without being recharged, a build-up of sulfur molecules on the battery plates takes place due to self-discharge of the battery. This formation of sulfur on the battery plates is called sulfation. Sulfation hardens the battery plates, reducing and eventually destroying the ability of the battery to generate charge. In lead acid batteries employing thin film positive and negative plates, relatively rapid hardening of the plates due to sulfation occurs because the plates are ultra-thin films.

One prior art technique used to counteract self-discharge in lead acid batteries involves connecting an alkaline battery (or multiple series connected alkaline batteries) in parallel with the lead acid battery when it is left idle. The alkaline battery provides a charging voltage that counteracts self-discharge in the lead acid storage battery. However, when a relatively small drop in the capacity of the alkaline battery takes place, the charging voltage drops below the rated voltage of the lead acid storage battery resulting in self-discharge and sulfation in the lead acid battery. Thus, to prevent self-discharge using this technique, alkaline batteries have to be replaced frequently because they are unsuitable even after a small loss of capacity. This technique for preventing self-discharge in lead acid batteries is inconvenient and costly.

SUMMARY OF THE INVENTION

A system for counteracting self-discharge in a storage battery is provided. The system includes a charge supply battery that provides a supply voltage. The system also includes a DC-DC converter circuit that has an input that electrically couples to the charge supply battery and an output that electrically couples to terminals of the storage battery. The DC-DC converter circuit provides a charging voltage at the output that has a magnitude greater than a magnitude of the supply voltage. The storage battery is a carbon battery (battery that utilizes carbon in a suitable form to prevent/slow down electrode corrosion).

BRIEF DESCRIPTION OF THE DRAWINGS

FIGS. 3-1 and 3-2 illustrate embodiments of an apparatus for providing energy to a vehicle battery.

FIG. 7-1 is a diagrammatic, cross-sectional representation of the electrode plate of FIG. 6 taken along the line A-A.

FIG. 7-2 is an enlarged view of a portion of the cross-sectional representation of FIG. 7-1.

DETAILED DESCRIPTION OF THE PREFERRED EMBODIMENTS

Figure 1:
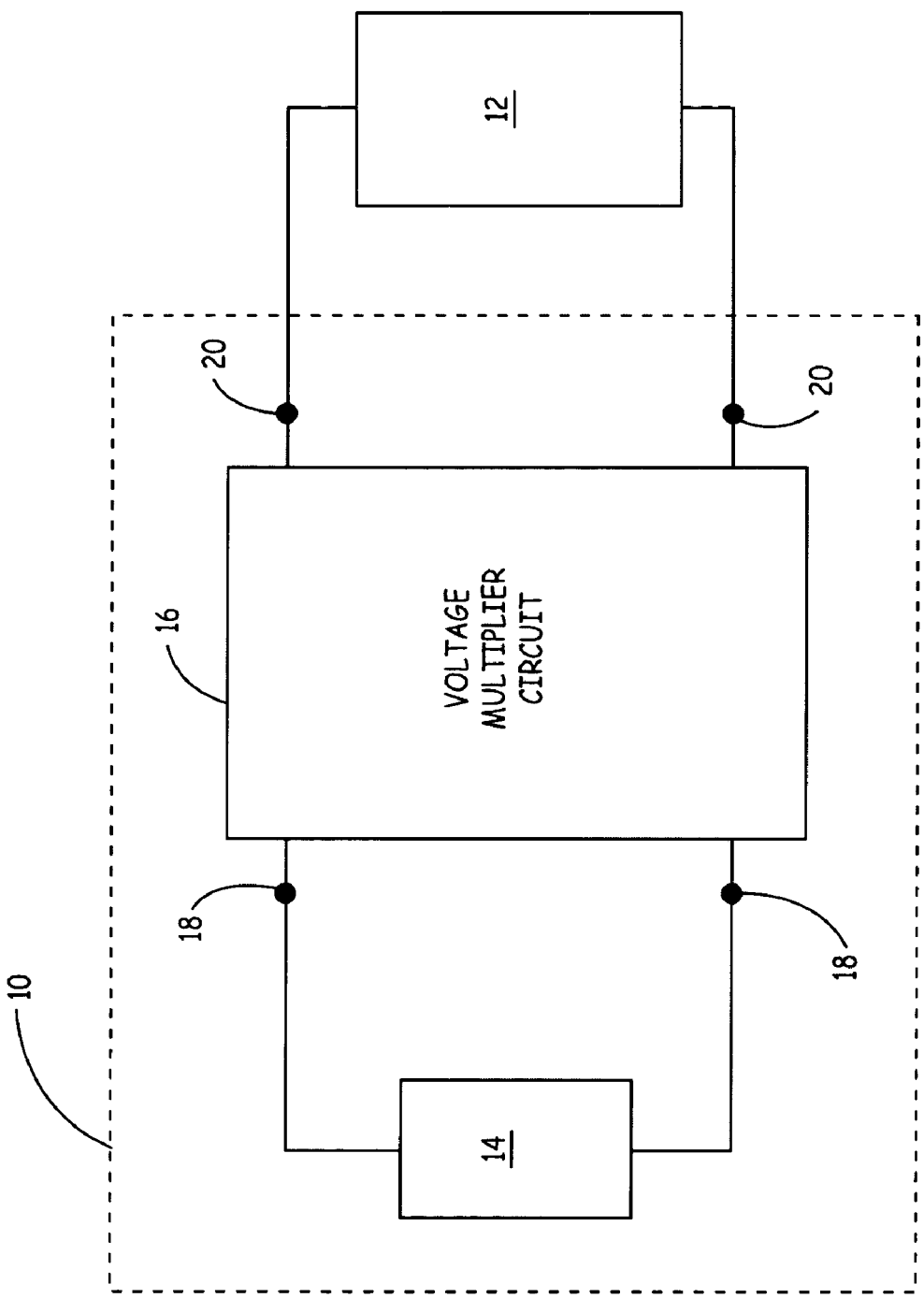
FIG. 1 is a simplified block diagram of an apparatus for counteracting self-discharge in a storage battery in accordance with an embodiment of the present invention.

FIG. 1 is a simplified block diagram of a self discharge prevention apparatus 10 for counteracting self discharge in a rechargeable storage battery 12 in accordance with an embodiment of the present invention. Self-discharge prevention apparatus 10 includes a charge supply battery 14 and a DC-DC converter circuit 16. Charge supply battery 14 provides charging energy necessary to counteract self-discharge of battery 12. Charge supply battery 14 may be, for example, one or more commercially available "D" alkaline batteries. If multiple batteries are employed, they are connected in series with each other. DC-DC converter circuit 16 may be any charge pump or multiplier circuit known or yet to be discovered in the art. Such charge pump circuits typically include a charge storage device, such as a capacitor and/or an inductor, that can be charged individually by a supply voltage and form a series connected chain to provide a multiplied voltage output.

Apparatus 10 is electrically coupled to storage battery 12 when it is left idle. Apparatus 10 can be a physical component of battery 12 or can be connected to battery 12 during a period of storage such as after manufacture. As can be seen in FIG. 1, charge supply battery 14 is connected to an input, shown by nodes 18, of DC-DC converter circuit 16 and storage battery 12 is coupled to an output, shown by nodes 20, of DC-DC converter circuit 16. DC-DC converter circuit 16 can provide a charging voltage as a function of the supply voltage provided by charge supply battery 14. The charging voltage provided has a magnitude sufficient to prevent self-discharge of storage battery 12. In some embodiments, the charging voltage has a magnitude that is greater than or equal to the rated voltage of storage battery 12. DC-DC converter circuit 16 can maintain the charging voltage magnitude at a level sufficient to prevent self-discharge of storage battery 12 when the magnitude of the supply voltage decreases due to a reduction in the capacity of charge supply battery 14. Thus, by employing DC-DC converter circuit 16, the present invention takes full advantage of the life span of charge supply battery 14, which can be employed until the end of its useful life. The useful life of a battery is over when its voltage drops below a certain threshold, which is usually about 60% of the rated battery voltage in an alkaline battery.

The present invention is particularly useful in preventing self-discharge of an internal booster battery employed in a jump-start booster pack, which typically remains idle in a vehicle until such time as it is necessary to be used. Such a jump-start booster pack is described in connection with FIG. 2 below.

Figure 2:
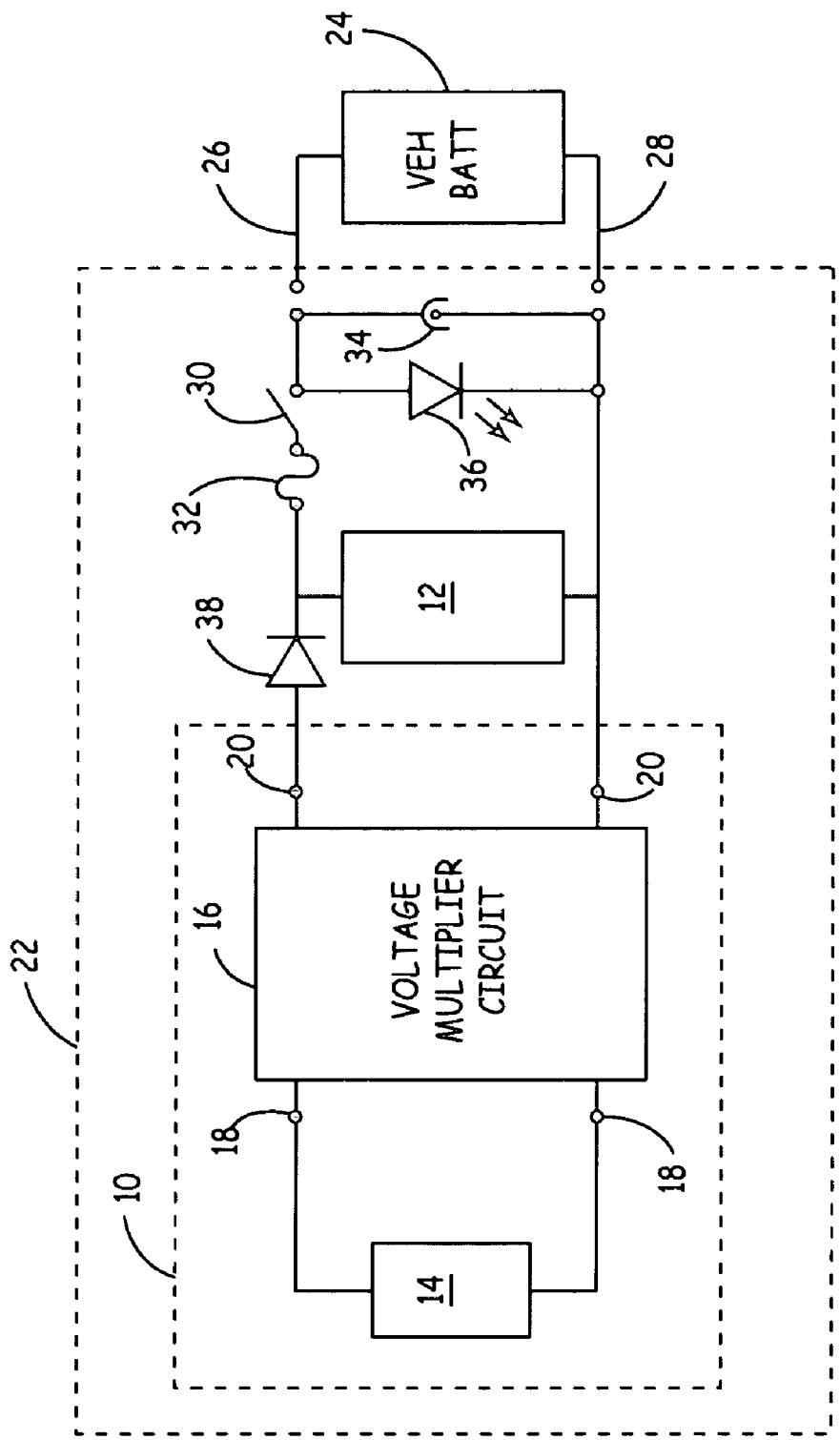
FIG. 2 is a simplified block diagram showing a jump-start booster pack in accordance with an embodiment of the present invention.

FIG. 2 is a very simplified block diagram showing a jump-start booster pack 22 in accordance with an embodiment of the present invention. Jump-start booster pack 22 includes, as its principal components, self-discharge prevention apparatus 10 and storage battery or internal booster battery 12. Internal booster battery 12 has substantially equal terminal voltage to the rated voltage of vehicle battery 24 to be boosted. As can be seen in FIG. 2, Cables 26 and 28 are schematically indicated, and are provided to connect booster battery 12 to vehicle battery 24 to be boosted. A switch 30 is provided in series with either cable 26 or 28 (only one switch, at one side of the circuit is required) so as to provide a connection between booster battery 12 and vehicle battery 24, after the cables 26 and 28 have been put in place. A fuse 32 is provided in series with the switch 30. Alternatively, fuse 32 and switch 30 could be provided as a single entity, such as a circuit breaker switch. There is also provided protection against inadvertent wrong polarity connections being made.

The capacity of booster battery 12 is relatively small compared with the capacity of the vehicle battery 24, and is generally in the range of from about 1% to less than 25% of the ampere-hour rated capacity of the vehicle battery 24. In embodiments of the present invention, jump-start booster pack 22 includes a handle (not shown) and is transportable on wheels (not shown). In some embodiments, jump-start booster pack 22 is portable and may generally have a weight of about 3.0 Kg to about 5.0 Kg. A preferred internal booster battery for a portable embodiment of booster pack 22 is a Thin Metal Film (TMF) lead acid battery. These batteries have very high cranking current, almost no reserve capacity, and very small size and weight. Self-discharge prevention apparatus 10, employed in booster pack 22, prevents sulfation, which occurs relatively rapidly in TMF lead acid batteries.

A lamp 36, such as a LED, may be provided across the terminals of the booster battery 12 at a position on a side of switch 30 which is remote from booster battery 12. Therefore, when booster battery 12 is connected to vehicle battery 24, and the switch 30 is closed, lamp 36 will be illuminated. Lamp 36 may be Zener operated in such a manner that it will only illuminate when it is connected across the voltage of the booster battery 12, but not across a substantially depleted terminal voltage of the vehicle battery 24.

As mentioned above, apparatus 10 is capable of preventing self-discharge of internal booster battery 12. Further, apparatus 10 can provide a trickle charge to booster battery 12 to recharge it over a relatively long period of time after a jump start is performed. However, to relatively rapidly charge internal booster battery 12 just after a jump-start, embodiments of the present invention include battery charging circuitry, discussed further below in connection with FIGS. 3-1 and 3-2. In some embodiments of the present invention, internal booster battery 12 may be charged by vehicle battery 24 or a vehicle alternator system (not shown). A suitable mode selection switch (not shown in FIG. 2) is typically included to select a particular charging mode for recharging internal booster battery 12. A diode 38, may be included to prevent backflow of energy from internal booster battery 12 when it is being charged. Connecting the booster battery 12 to the vehicle battery 24 may simply involve plugging wires which are also permanently connected to the terminals of the booster battery 12 and to a cigarette lighter plug into a cigarette lighter socket.

In some embodiments of the present invention, apparatus 22 can function as a portable power pack. In such embodiments, a connection or socket means, shown schematically at 34, which is essentially identical to a cigarette lighter socket may be connected across the terminals of the booster battery 12. Battery or low voltage operated devices such as emergency lamps, search lamps, a vacuum cleaner, etc., may be powered for a short term from the booster battery 12 by being connected from their own plug to the cigarette lighter socket arrangement 34.

To operate jump-start booster pack 22 to provide sufficient starting energy to vehicle battery 24, the appropriate connections are made as discussed above. In actuality, a pair of cables may be provided having clamps at one end of each cable to be connected to the terminals of the vehicle battery 24; and having a polarized plug at the other end of each cable for connection to a provided socket in jump-start booster pack 22. Then, after the cables are connected to the vehicle battery 24 and to the socket connection for the booster battery 12, the switch 30 is then closed and energy will flow from the booster battery 12 to the vehicle battery 24. In the usual circumstances, the voltage of the booster battery 12 is approximately 12 volts, and the rated voltage of the vehicle battery 24 is also 12 volts although the actual terminal voltage of the vehicle battery may have reduced to as little as 9 or even 6 volts. In any event, after connection of the booster battery 12 to the vehicle battery 24, the voltage of the parallel connected batteries rises to a level which is necessary to initiate and sustain spark ignition during cranking.

Figures 1, 3:
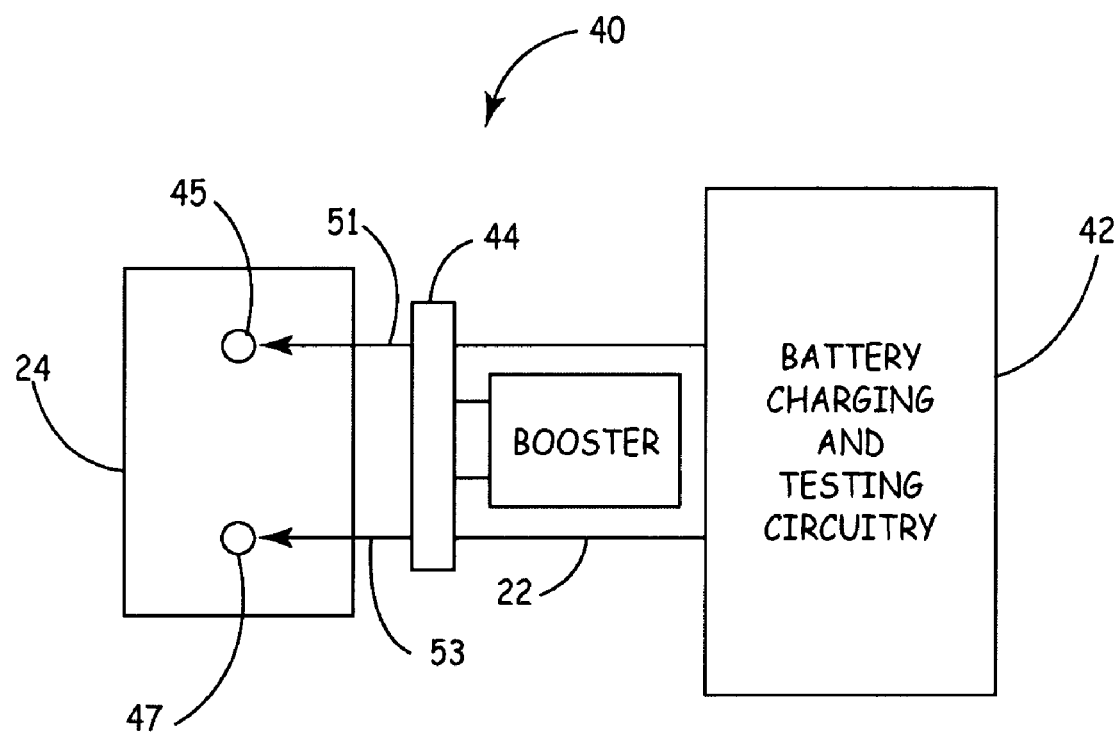
Figures 2, 3:
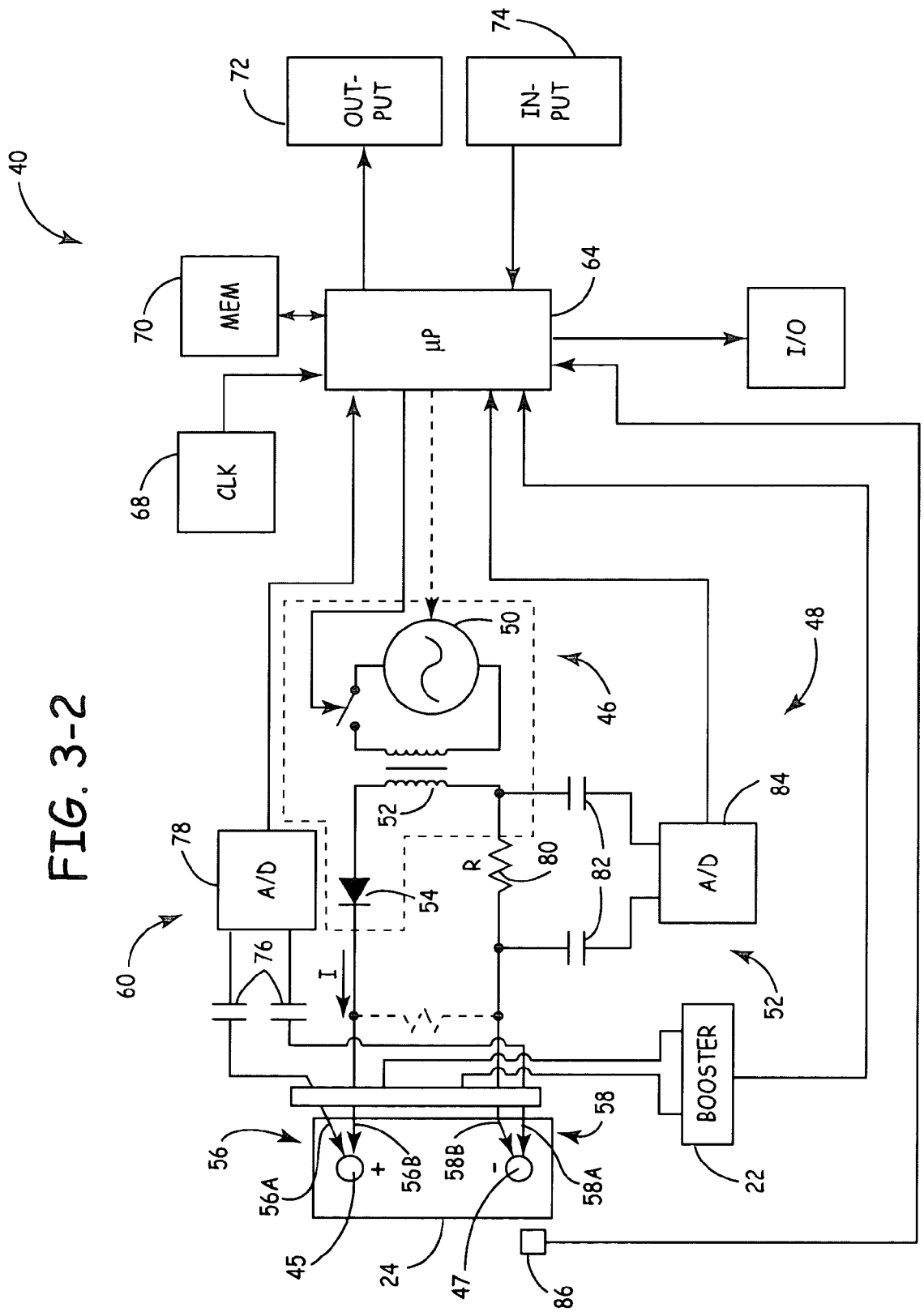

FIG. 3-1 is a very simplified block diagram of a jump-start booster pack with integrated battery charging and testing circuitry in accordance with an embodiment of the present invention. System 40 is shown coupled to a vehicle battery 24. System 40 includes battery charging and testing circuitry 42, jump-start booster pack 22, described above in connection with FIG. 2, and mode selection switch 44. System 40 couples to battery contacts 45 and 47 through electrical connections 51 and 53, respectively. Details and components of a battery charging and testing circuitry 42 are provided in the description of FIG. 3-2 below. Mode selection switch 44 can be set in different positions, with each position corresponding to a different mode in which system 40 operates. For example, system 40 can be set to operate in modes such as "charge vehicle battery", "charge booster battery", "charge vehicle battery and booster battery", "jump-start vehicle battery", "test vehicle battery", "test booster battery", "preserve booster battery", etc.

FIG. 3-2 is a simplified block diagram of an embodiment of system 40 showing components of charging and testing circuitry 42. System 40 is shown coupled to vehicle battery 12. System 40 includes battery charger circuitry 46, battery test circuitry 48 and a jump-start booster pack 22. Battery charge circuitry 46 generally includes AC source 50, transformer 52 and rectifier 54. System 40 couples to vehicle battery 12 through electrical connection 56 which couples to the positive battery contact 45 and electrical connection 58 which couples to the negative battery contact 47. Mode selection switch 44 can be set in the different positions mentioned above in connection with FIG. 3-1. In one preferred embodiment, a four point (or Kelvin) connection technique is used in which battery charge circuitry 46 couples to battery 24 through electrical connections 56A and 58A while battery testing circuitry 48 couples to vehicle battery 24 through electrical connections 56B and 58B.

Battery testing circuitry 48 includes voltage measurement circuitry 60 and current measurement circuitry 62 which provide outputs to microprocessor 64. Microprocessor 64 also couples to a system clock 68 and memory 70 which is used to store information and programming instructions. In the embodiment of the invention shown in FIG. 3-2, microprocessor 64 also couples to booster pack 22, user output circuitry 72 and user input circuitry 74.

Voltage measurement circuitry 60 includes capacitors 76 which couple analog to digital converter 78 to vehicle battery 24 thorough electrical connections 56B and 58B. Any type of coupling mechanism may be used for element 76 and capacitors are merely shown as one preferred embodiment. Further, the device may also couple to DC signals. Current measurement circuitry 62 includes a shunt resistor (R) 80 and coupling capacitors 82. Shunt resistor 80 is coupled in series with battery charging circuitry 46. Other current measurement techniques are within the scope of the invention including Hall-Effect sensors, magnetic or inductive coupling, etc. An analog to digital converter 84 is connected across shunt resistor 80 by capacitors 82 such that the voltage provided to analog to digital converter 84 is proportional to a current I flowing through vehicle battery 24 due to charging circuitry 46. Analog to digital converter 84 provides a digitized output representative of this current to microprocessor 64.

During operation in vehicle battery charging mode, AC source 50 is coupled to vehicle battery 24 through transformer 52 and rectifier 54. Rectifier 54 provides half wave rectification such that current I has a non-zero DC value. Of course, full wave rectification or other AC sources may also be used. Analog to digital converter 84 provides a digitized output to microprocessor 64 which is representative of current I flowing through vehicle battery 24. Similarly, analog to digital converter 78 provides a digitized output representative of the voltage across the positive and negative terminals of vehicle battery 24. Analog to digital converters 78 and 84 are capacitively coupled to vehicle battery 24 such that they measure the AC components of the charging signal.

Microprocessor 64 determines the conductance of vehicle battery 24 based upon the digitized current and voltage information provided by analog to digital converters 84 and 78, respectively. Microprocessor 64 calculates the conductance of vehicle battery 24 as follows:

$$\text{Conductance} = G = \frac{I}{V} \quad \text{Eq. 1}$$

where I is the AC charging current and V is the AC charging voltage across vehicle battery 24. The battery conductance is used to monitor charging of vehicle battery 24. It has been discovered that as a battery is charged the conductance of the battery rises which can be used as feedback to the charger. This rise in conductance can be monitored in microprocessor 64 to determine when the battery has been fully charged. Conductance can be correlated to a condition of vehicle battery 24 which can be used as a basis for comparison of the battery against a battery rating, such as the Cold Cranking Amp (CCA) rating of the battery. A temperature sensor 86 can be thermally coupled to battery 24 and used to compensate battery measurements. Temperature readings can be stored in memory 70 for later retrieval.

In accordance with the present invention, the internal booster battery 12 of booster pack 22 can also be charged and tested by battery charging and testing circuitry 42 in a manner similar to that described for charging and testing vehicle battery 24. In embodiments of the present invention, vehicle battery 24 can also be charged by booster battery 12. Results of tests performed on internal booster battery 12 and vehicle battery 24 may be displayed on a suitable device (not shown) that can couple to microprocessor 64.

Figure 4:
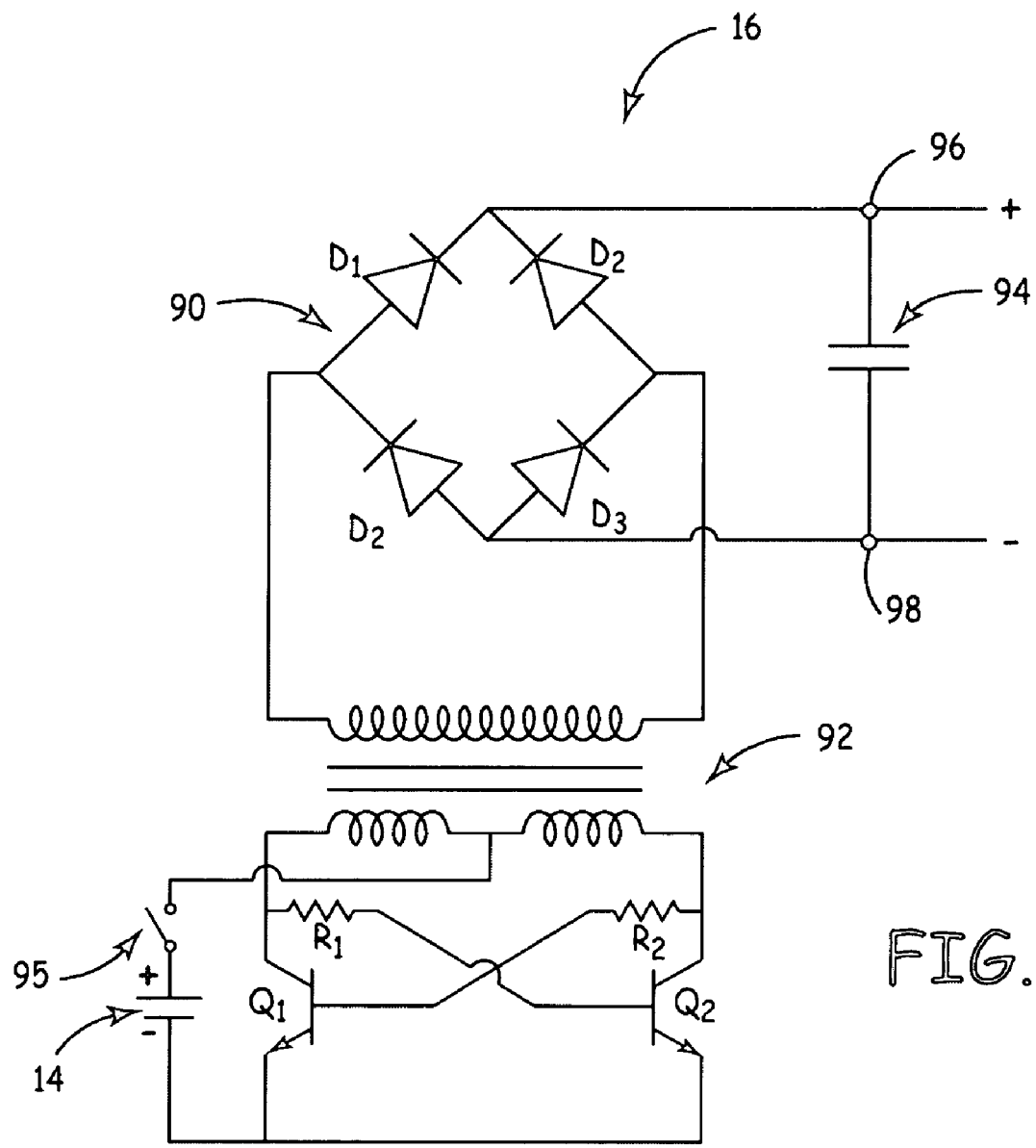
FIG. 4 illustrates a DC-DC converter circuit which is used with the present invention.

FIG. 4 illustrates a DC-DC converter circuit 16 which is used with the present invention. DC-DC converter circuit 16 includes two transistors Q1 and Q2, two resistors R1 and R2, a transformer 92, a bridge rectifier 90 including four diodes D1, D2, D3 and D4 and a capacitor 94. Charge supply battery 14, which provides an input voltage or supply voltage, is coupled to the primary side of transformer 92. An output voltage or changing voltage having a magnitude greater than the magnitude of the supply voltage is obtained across capacitor 94 on the secondary side of transformer 92.

In operation, when switch 95 is closed, power is applied to transistors Q1 and Q2 from battery 14. Transistors Q1 and Q2 drive the transformer primary with the base drive for each transistor coming from the collector of the other transistor. When power is applied, suppose transistor Q1 turns on a few nanoseconds faster than transistor Q2, then the collector voltage of transistor Q1 drops, shutting off transistor Q2, and collector voltage of transistor Q2 rises causing a greater collector current to flow through transistor Q1. The collector voltage of transistor Q1 drops further due to the inductive reactance of the primary coil of transformer 92.

As current flows through the primary winding of transformer 92, a voltage is induced in the transformer secondary winding by the expanding magnetic field in the transformer core. At a certain point, the magnetic field stops expanding, because either the transistor Q1 has reached the maximum collector current it can pass, or because the transformer core has reached the maximum magnetic field it can hold. In either case, the inductive reactance of the transformer primary drops, causing the voltage on the collector of transistor Q1 to rise. Since the collector of transistor Q1 drives the base of transistor Q2, Q2 turns on, which in turn shuts off transistor Q1. Now current flows in the opposite direction through the primary winding, causing the magnetic field in the core to reverse itself, which induces an opposite voltage in the secondary which continues until the field stops expanding and the process switches again. Bridge rectifier 90 ensures that the voltage across capacitor 94 always has the same polarity (positive at node 96 and negative at node 98). As mentioned above, transformer 92 is configured to provide a secondary voltage that is greater than the primary voltage. Thus, circuit 16 boosts the input voltage provided by battery 14. The boosted voltage across capacitor 94 is the voltage applied to storage battery 12 (or a carbon battery described further below).

In general, storage battery 12, that is protected from self-discharge using the self-discharge prevention technique of the present invention, consists of a plurality of individual storage cells connected in series. Typically, each cell has a voltage potential of about 2.1 volts. By connecting the cells in series, the voltage of the individual cells are added in a cumulative manner. Thus, storage battery 12 may be a 6-cell battery (12.6V), a 12-cell battery (25.2V), an 18-cell battery (42V), a 24-cell battery (50.4V), etc. The self-discharge prevention technique of the present invention is applicable for the preservation of any type of battery that is prone to self-discharge. These include all types of lead-acid batteries, nickel-metal hydride batteries, nickel-cadmium and lithium ion batteries.

Figure 5:
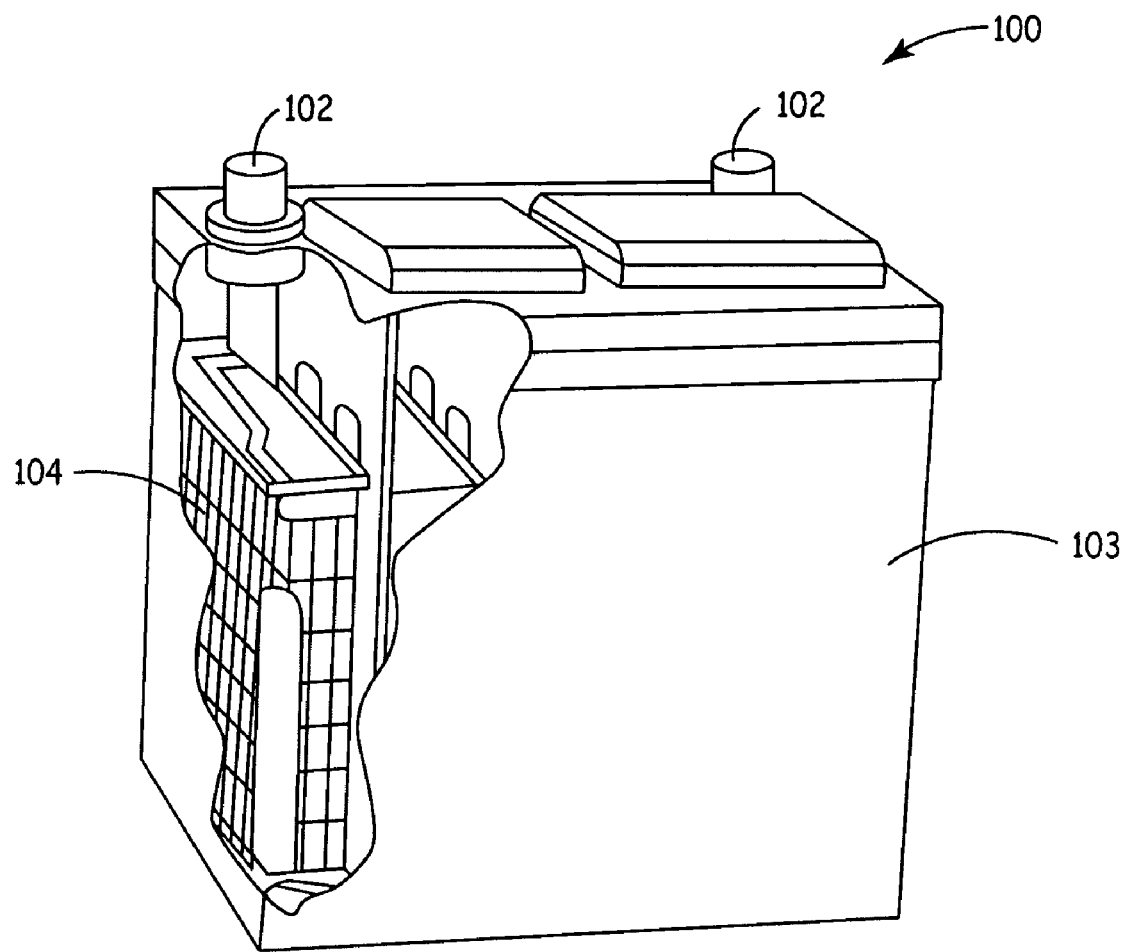
FIG. 5 is a diagrammatic cut-away representation of a carbon battery.

In addition to the batteries mentioned/described above, carbon batteries (batteries that utilize carbon in various forms to prevent/slow down corrosion of battery electrodes) are also prone to self-discharge. FIG. 5 illustrates a general embodiment of a carbon battery 100. Carbon battery 100 includes a housing 103 and terminals 102. At least one cell 104 is disposed within housing 103. While carbon battery 100 may include only one cell, several cells may be connected in series or in parallel to provide a total desired capacity of carbon battery 100. Cell 104 may be composed of alternating positive and negative plates immersed in an electrolytic solution including, for example, sulfuric acid. Specific embodiments of carbon batteries are described below in connection with FIGS. 6, 7-1, 7-2 and 8.

Figure 6:
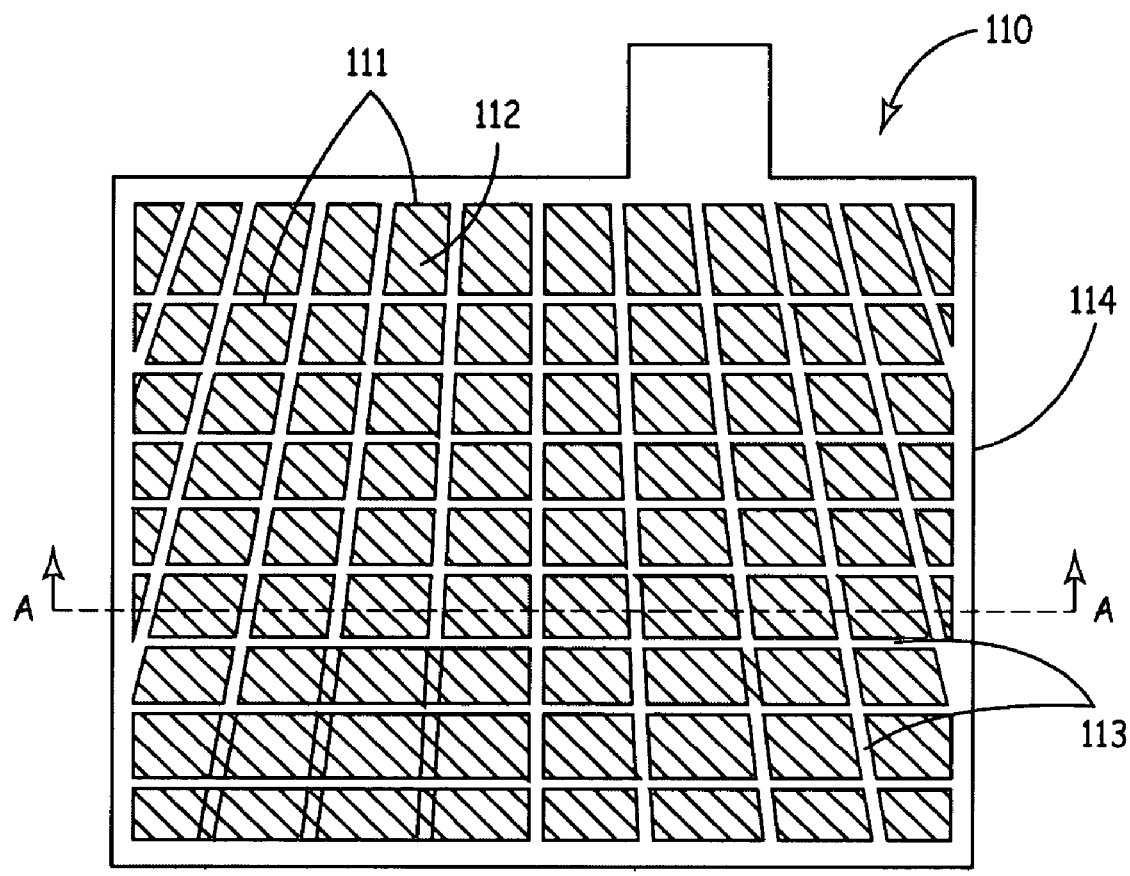
FIG. 6 is a diagrammatic representation of an electrode plate in accordance with an exemplary embodiment.

U.S. application Ser. No. 10/422,981, entitled CARBON COATED BATTERY ELECTRODES describes one type of carbon battery. Here, the carbon battery comprises an electrode (formed from, for example, a metal or any other suitable conductive material) on which a vapor-deposited carbon thin film is present. FIG. 6 illustrates a positive plate 110 of such a carbon battery. Positive plate 110 is included in a cell such as 104 (FIG. 5). One element of positive plate 110 is a conductive electrode 114 that may serve as the positive current collector of positive plate 110. While electrode 114 may include various different configurations, in one exemplary embodiment, electrode 114 may be arranged in a grid pattern including an array of crossing members 113. The array of crossing members 113 may define a plurality of interstices 111 that can be filled with a chemically active paste, such as, for example, lead dioxide ($PbO_2$) paste 112. The chemically active paste may serve as an active material of positive plate 110. Structurally, the negative current collectors of the negative plates of each cell 104 (FIG. 5) may be similar to the current collectors of positive plates 110 of cell 104. The negative plates, however, may or may not include lead dioxide paste as an active material. The negative current collectors may include sponge lead or another suitable material that can serve as the active material for the negative plates. Surfaces of electrode 114 include a thin film of carbon, which may be formed by vapor deposition.

Figures 1, 7:
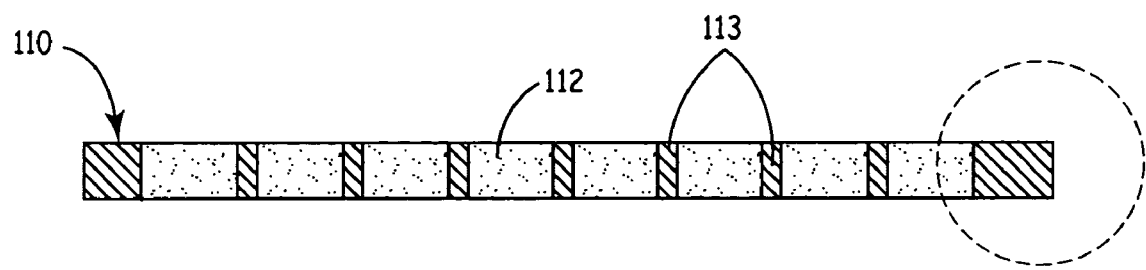
Figures 2, 7:
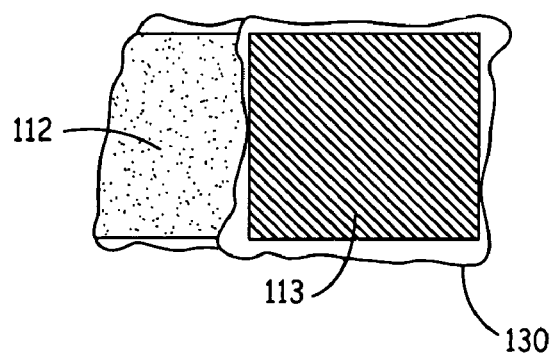

FIG. 7-1 illustrates a cross-sectional view of positive plate 110 taken along the line A-A, as shown in FIG. 6. As mentioned above, a vapor-deposited carbon thin film is present on electrode 114, including cross members 113. FIG. 7-2 provides an enlarged view of the area of the positive plate 110 surrounded by the dashed circle, as shown in FIG. 7-1. While not to scale, FIG. 7-2 illustrates vapor-deposited carbon film 130 on a cross member 113 of the electrode 114. Carbon film 130 may cover only a portion of the electrode surface area or may cover substantially all surfaces of electrode 114. Vapor-deposited carbon thin film 130, may have a thickness that is uniform or non-uniform over the surface of electrode 114. Once electrode 114 has been coated with carbon film 130, the electrode may be packed with paste 112 to form, for example, positive plate 110.

Figure 8:
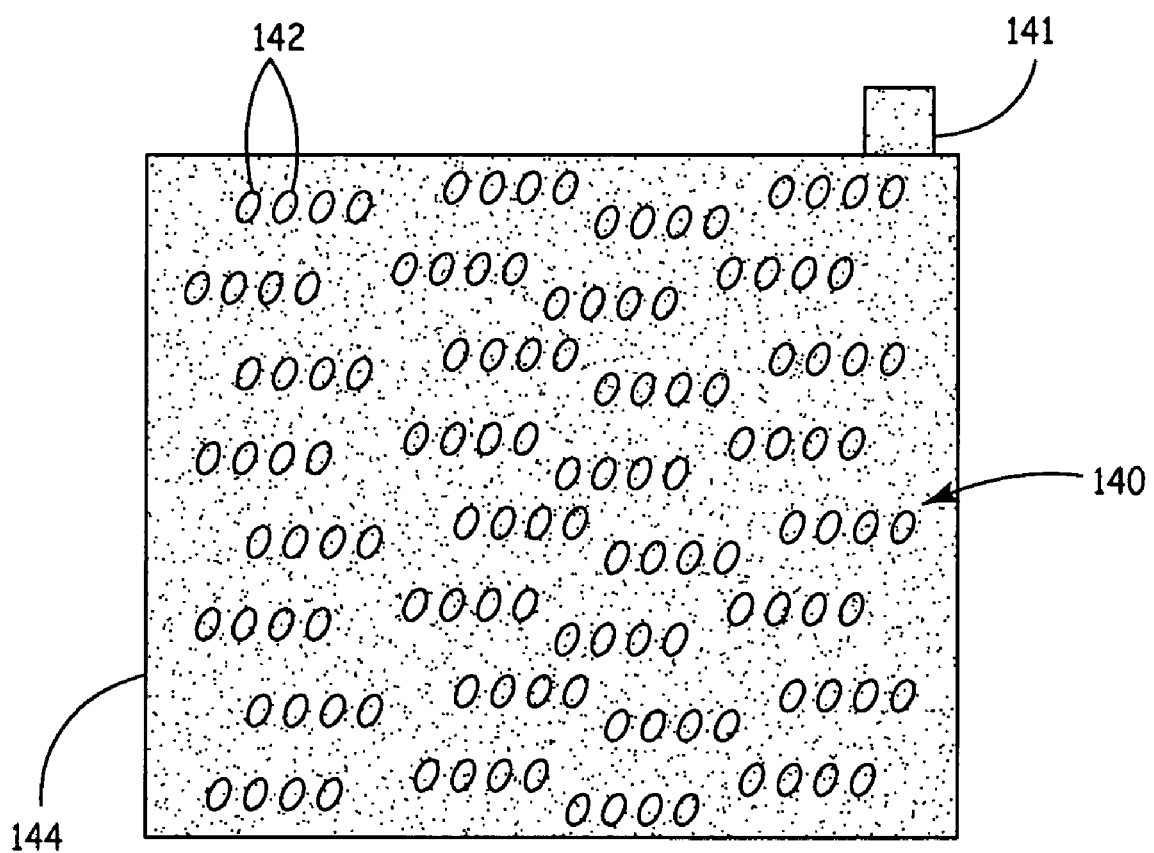
FIG. 8 is a diagrammatic representation of a current collector.

U.S. application Ser. No. 10/183,471, entitled BATTERY INCLUDING CARBON FOAM CURRENT COLLECTORS describes another type of carbon battery. Here, the carbon battery includes at least one positive plate that includes a carbon foam current collector including a network of pores, and a chemically active paste disposed on the carbon foam current collector such that the chemically active paste penetrates the network of pores. FIG. 8 illustrates a current collector 140 of such a carbon battery. The current collector of FIG. 8 may be used to form either a positive or a negative plate. Collector 140 is formed of a porous, carbon foam material. The carbon foam includes a network of pores (such as 142), which provides a large amount of surface area for each current collector 140. Tab 141, which is formed on current collector 140, may be coated with a conductive material and used to form an electrical connection with the current collector 140. Coating tab 21 with a conductive material provides structural support for tab 21 and creates a suitable electrical connection capable of handling the high currents present in a lead acid battery.

The current collector in FIG. 8 may be used to form either a positive or a negative plate. Thus, as in the case of the embodiment described above in connection with FIGS. 6, 7-1 and 7-2, the negative current collectors of the negative plates of each cell 104 (FIG. 5) may be structurally similar to the current collectors of the positive plates of cell 104. The negative plates, however, may or may not include lead dioxide paste (which is typically included on the positive plates) as an active material. The negative current collectors may include sponge lead or another suitable material that can serve as the active material for the negative plates. The chemically active paste is designated by reference numeral 144.

Figure 9:
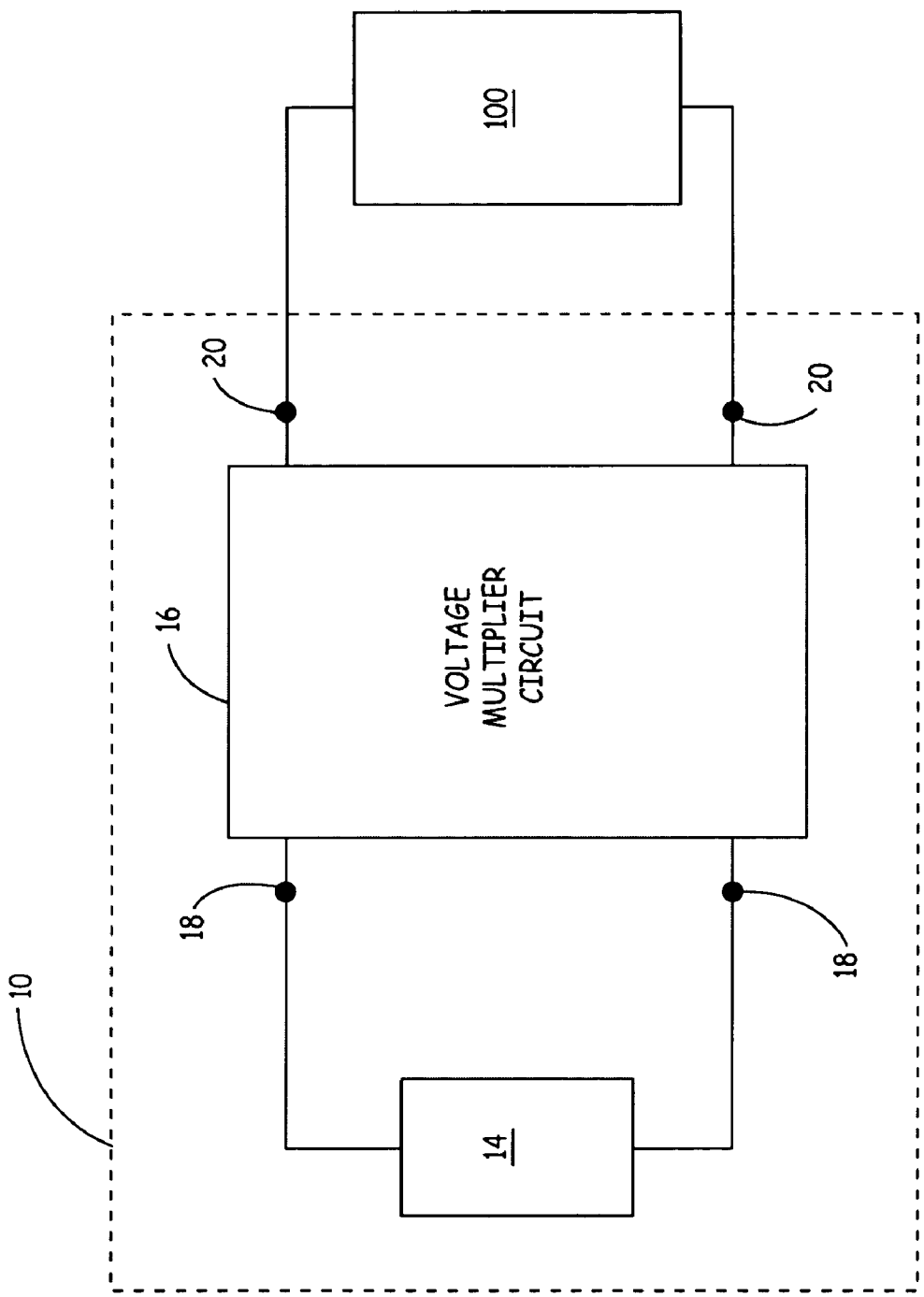
FIG. 9 is a simplified block diagram of an apparatus for counteracting self-discharge in a carbon battery in accordance with an embodiment of the present invention.
Figure 10:
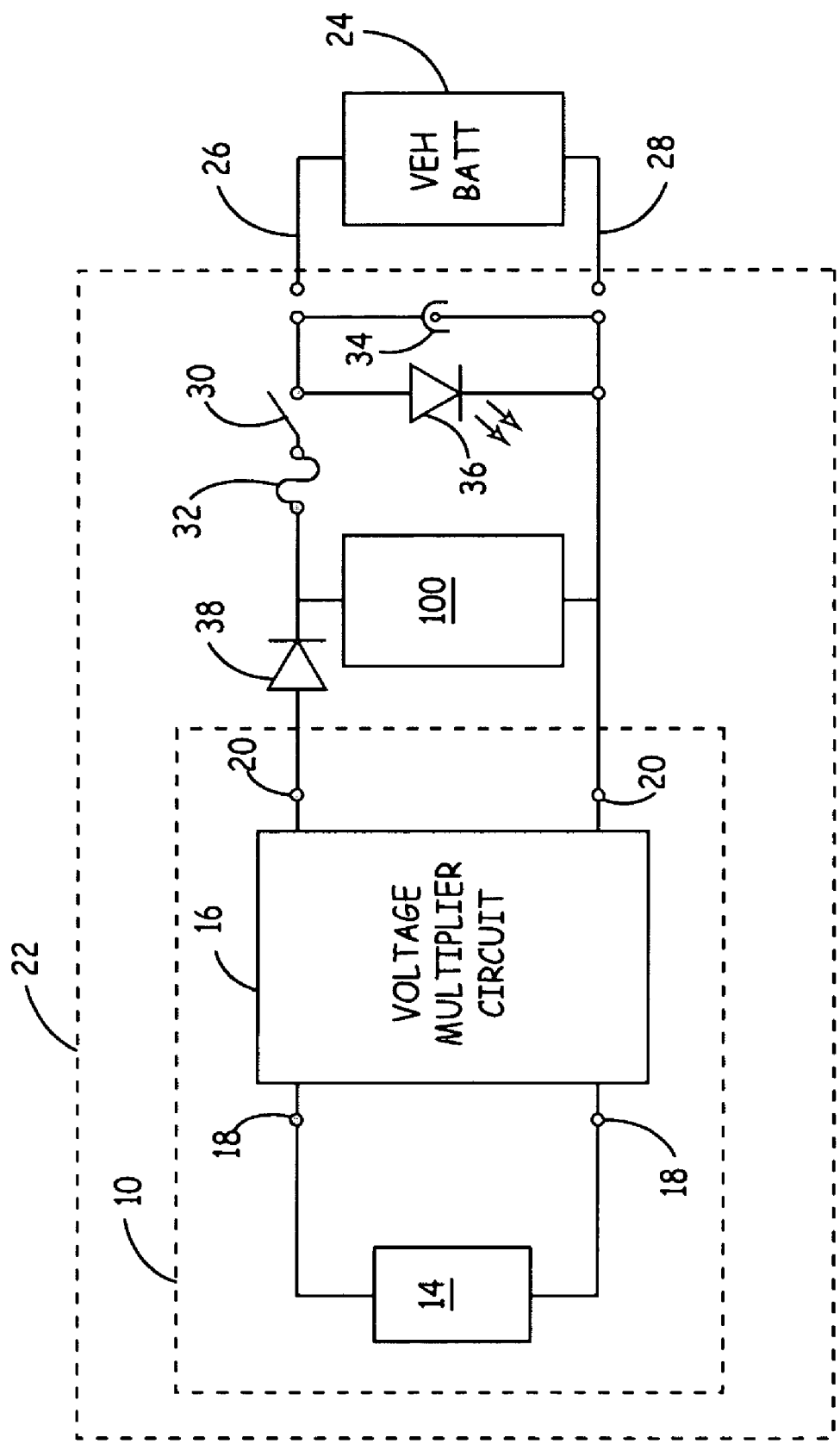
FIG. 10 is a simplified block diagram showing a jump-start booster pack including a carbon booster battery in accordance with an embodiment of the present invention.

The embodiments of FIGS. 9 and 10 are similar to the embodiments of FIGS. 1 and 2, respectively. However, in FIGS. 9 and 10, respectively, a carbon battery 100 is employed instead of battery 12 (FIGS. 1 and 2). The remaining components of the embodiments of FIGS. 9 and 10 are similar to the components of FIGS. 1 and 2 and operate in a manner similar to that described above in connection with FIGS. 1 and 2. Also, a carbon battery (such as 100) can be employed in the embodiments of FIGS. 3-1 and 3-2.

Although the present invention has been described with reference to preferred embodiments, workers skilled in the art will recognize that changes may be made in form and detail without departing from the spirit and scope of the invention. It should be understood that the term "vehicle" not only includes cars and trucks, but can be equally applied to such installations as motors for boats, motorcycles, snowmobiles, farm tractors, etc. As mentioned above, charge supply battery 14 is a "household" battery or "small" battery with 1.5 V cells (such as D, C, AA and AAA batteries) that can be readily purchased off the shelf. Thus, in embodiments of the present invention, charge supply battery 14 may be one or more "AA" alkaline batteries, one or more "C" alkaline batteries, one or more "D" alkaline batteries or one or more "AAA" alkaline batteries. In some embodiments, the "amp-hour" capacity of the charge supply battery is greater than the "amp-hour" capacity or rechargeable storage battery 12. In such embodiments, charge supply battery 14 is capable of recharging storage battery 12.

What is claimed is:

1. An apparatus for counteracting self discharge in a storage battery, comprising:
   a charge supply battery configured to provide a supply voltage; and
   a DC-DC converter circuit having an input electrically coupled to the charge supply battery and an output configured to electrically couple to terminals of the storage battery;
   wherein the charge supply battery is of a different type and construction than the storage battery,
   wherein the charge supply battery has a nominal voltage lower than that of the storage battery,
   wherein the DC-DC converter circuit is configured to provide a charging voltage at the output having a magnitude greater than a magnitude of the supply voltage, and wherein the charge supply battery provides a charge to the storage battery via the DC-DC converter circuit to increase a life of the storage battery by preventing self discharge of the storage battery.

2. The apparatus of claim 1 wherein the DC-DC converter circuit comprises a transformer configured to step up the supply voltage.

3. The apparatus of claim 2 wherein the DC-DC converter further comprises a bridge rectifier circuit configured to provide rectification of the stepped up supply voltage provided by the transformer.

4. The apparatus of claim 1 wherein the DC-DC converter circuit includes a transistor.

5. The apparatus of claim 1 wherein the DC-DC convener circuit includes a charge storage device.

6. The apparatus of claim 5 wherein the charge storage device is a capacitor.

7. The apparatus of claim 1 wherein the charge supply battery is a single cell.

8. The apparatus of claim 1 wherein the charge supply battery includes a plurality of cells.

9. The apparatus of claim 8 wherein the plurality of cells is two cells.

10. The apparatus of claim 1 wherein the charge supply battery is a "D" cell alkaline battery and the storage battery is a lead acid battery.

11. The apparatus of claim 1 wherein the charge supply battery includes a plurality of "D" cell alkaline batteries and the storage battery is a lead acid battery.

12. The apparatus of claim 11 wherein the plurality of "D" cell alkaline batteries is two "D" cell alkaline batteries and the storage battery is a lead acid battery.

13. The apparatus of claim 1 wherein the charge supply battery is a "AA" alkaline battery and the storage battery is a lead acid battery.

14. The apparatus of claim 1 wherein the charge supply battery includes a plurality of "AA" alkaline batteries and the storage battery is a lead acid battery.

15. The apparatus of claim 14 wherein the plurality of "AA" alkaline batteries is two "AA" alkaline batteries and the storage battery is a lead acid battery.

16. The apparatus of claim 1 wherein the charge supply battery is a "C" cell alkaline battery and the storage battery is a lead acid battery.

17. The apparatus of claim 1 wherein the charge supply battery includes a plurality of "C" cell alkaline batteries and the storage battery is a lead acid battery.

18. The apparatus of claim 1 wherein the plurality of "C" cell alkaline batteries is two "C" cell alkaline batteries and the storage battery is a lead acid battery.

19. The apparatus of claim 1 wherein the storage battery is a carbon battery and the charge supply battery is an alkaline battery.

20. The apparatus of claim 19 wherein the carbon battery comprises at least one carbon coated battery electrode.

21. The apparatus of claim 20 further comprising a chemically active paste disposed on the at least one carbon coated battery electrode.

22. The apparatus of claim 19 wherein the carbon battery comprises at least one carbon foam current collector including a network of pores.

23. The apparatus of claim 22 further comprising a chemically active paste disposed on the carbon foam current collector such that the chemically active paste penetrates into the network of pores.

24. The apparatus of claim 1 wherein the storage battery is a nickel-metal hydride battery and the charge supply battery is an alkaline battery.

25. The apparatus of claim 1 wherein the storage battery is a nickel cadmium battery and the charge supply battery is an alkaline battery.

26. The apparatus of claim 1 wherein the storage battery is a lithium ion battery and the charge supply battery is an alkaline battery.

27. The apparatus of claim 1 wherein the storage battery is a lead-acid battery and the charge supply battery is an alkaline battery.

28. The apparatus of claim 1 configured to counteract self-discharge in a 6-cell storage battery.

29. The apparatus of claim 1 configured to counteract self-discharge in a 12-cell storage battery.

30. The apparatus of claim 1 configured to counteract self-discharge in an 18-cell storage battery.

31. The apparatus of claim 1 configured to counteract self-discharge in a 24-cell storage battery.

32. A jump-start booster pack, comprising:
a booster battery configured to provide starting energy to a vehicle;
a charge supply battery configured to provide a supply voltage; and
a DC-DC converter circuit having an input electrically coupled to the charge supply battery and an output electrically coupled to the booster battery;
wherein the charge supply battery is of a different type and construction than the booster battery,
wherein the charge supply battery has a nominal voltage lower than that of the booster battery, and
wherein the charge supply battery provides a charge to the booster battery via the DC-DC converter circuit to increase a life of the booster battery by preventing self discharge of the booster battery.

33. The apparatus of claim 32 wherein the charge supply battery is a single cell.

34. The apparatus of claim 32 wherein the charge supply battery includes a plurality of cells.

35. The apparatus of claim 34 wherein the plurality of cells is two cells.

36. The apparatus of claim 32 wherein the charge supply battery is a "D" cell alkaline battery and the booster battery is a lead acid battery.

37. The apparatus of claim 32 wherein the charge supply battery includes a plurality of "D" cell alkaline batteries and the booster battery is a lead acid battery.

38. The apparatus of claim 37 wherein the plurality of "D" cell alkaline batteries is two "D" cell alkaline batteries and the booster battery is a lead acid battery.

39. The apparatus of claim 32 wherein the charge supply battery is a "AA" alkaline battery and the booster battery is a lead acid battery.

40. The apparatus of claim 32 wherein the charge supply battery includes a plurality of "AA" alkaline batteries and the booster battery is a lead acid battery.

41. The apparatus of claim 40 wherein the plurality of "AA" alkaline batteries is two "AA" alkaline batteries and the booster battery is a lead acid battery.

42. The apparatus of claim 32 wherein the charge supply battery is a "C" cell alkaline battery and the booster battery is a lead acid battery.

43. The apparatus of claim 32 wherein the charge supply battery includes a plurality of "C" cell alkaline batteries and the booster battery is a lead acid battery.

44. The apparatus of claim 43 wherein the plurality of "C" cell alkaline batteries is two "C" cell alkaline batteries and the booster battery is a lead acid battery.

45. The apparatus of claim 32 further comprising battery charging circuitry configured to charge a vehicle battery.

46. The apparatus of claim 45 wherein the battery charging circuitry is further configured to charge the booster battery.

47. The apparatus of claim 45 where the battery charging circuitry is coupled to the vehicle battery though a four point Kelvin connection.

48. The apparatus of claim 32 further comprising battery testing circuitry configured to test a vehicle battery.

49. The apparatus of claim 48 wherein the battery testing circuitry is further configured to test the booster battery.

50. The apparatus of claim 48 wherein the battery testing circuitry is coupled to the vehicle battery though a four point Kelvin connection.

51. The apparatus of claim 32 wherein the booster battery is a Thin Metal Film lead-acid battery and the charge supply battery is an alkaline battery.

52. The apparatus of claim 32 wherein the booster battery is a carbon battery and the charge supply battery is an alkaline battery.

53. The apparatus of claim 52 wherein the carbon battery comprises at least one carbon coated battery electrode.

54. The apparatus of claim 53 further comprising a chemically active paste disposed on the at least one carbon coated battery electrode.

55. The apparatus of claim 52 wherein the carbon battery comprises at least one carbon foam current collector including a network of pores.

56. The apparatus of claim 55 further comprising a chemically active paste disposed on the carbon foam current collector such that the chemically active paste penetrates into the network of pores.

57. A method for counteracting self discharge in a storage battery, comprising:
providing a supply voltage from a charge supply battery that is of a different type and construction than the storage battery, the charge supply battery having a nominal voltage lower than that of the storage battery; and
providing a charging voltage to the storage battery as a function of the supply voltage, with the charging voltage having a magnitude greater than a magnitude of the supply voltage,
wherein the charging voltage provided to the storage battery increases a life of the storage battery by preventing self discharge of the storage battery.

58. The method of claim 57 wherein providing the charging voltage is carried out by a DC-DC converter circuit.

59. The method of claim 58 wherein the DC-DC converter circuit comprises a transformer configured to step up the supply voltage.

60. The method of claim 59 wherein the DC-DC convener further comprises a bridge rectifier circuit configured to provide rectification of the stepped up supply voltage provided by the transformer.

61. The method of claim 58 wherein the DC-DC convener circuit includes a transistor.

62. The method of claim 58 wherein the DC-DC convener circuit includes a charge storage device.

63. The method of claim 62 wherein the charge storage device is a capacitor.

64. The method of claim 57 wherein the charge supply battery is a single cell.

65. The method of claim 57 wherein the charge supply battery includes a plurality of cells.

66. The method of claim 65 wherein the plurality of cells is two cells.

67. The method of claim 57 wherein the charge supply battery is a "D" cell alkaline battery and the storage battery is a lead acid battery.

68. The method of claim 57 wherein the charge supply battery includes a plurality of "D" cell alkaline batteries and the storage battery is a lead acid battery.

69. The method of claim 68 wherein the plurality of "D" cell alkaline batteries is two "D" cell alkaline batteries and the storage battery is a lead acid battery.

70. The method of claim 57 wherein the charge supply battery is a "AA" alkaline battery and the storage battery is a lead acid battery.

71. The method of claim 57 wherein the charge supply battery includes a plurality of "AA" alkaline batteries and the storage battery is a lead acid battery.

72. The method of claim 71 wherein the plurality of "AA" alkaline batteries is two "AA" alkaline batteries and the storage battery is a lead acid battery.

73. The method of claim 57 wherein the charge supply battery is a "C" cell alkaline battery and the storage battery is a lead acid battery.

74. The method of claim 57 wherein the charge supply battery includes a plurality of "C" cell alkaline batteries and the storage battery is a lead acid battery.

75. The method of claim 74 wherein the plurality of "C" cell alkaline batteries is two "C" cell alkaline batteries and the storage battery is a lead acid battery.

76. The method of claim 57 wherein the storage battery is a carbon battery and the charge supply battery is an alkaline battery.

77. The method of claim 76 wherein the carbon battery comprises at least one carbon coated battery electrode.

78. The method of claim 77 further comprising a chemically active paste disposed on the at least one carbon coated battery electrode.

79. The method of claim 76 wherein the carbon battery comprises at least one carbon foam current collector including a network of pores.

80. The method of claim 79 further comprising a chemically active paste disposed on the carbon foam current collector such that the chemically active paste penetrates into the network of pores.

81. The method of claim 57 employed to counteract self-discharge in a 6-cell storage battery.

82. The method of claim 57 employed to counteract self-discharge in a 12-cell storage battery.

83. The method of claim 57 employed to counteract self-discharge in an 18-cell storage battery.

84. The method of claim 57 employed to counteract self-discharge in a 24-cell battery.

85. A method of making a jump-start booster pack, comprising:
providing a booster battery configured to provide starting energy to a vehicle;
providing a charge supply battery configured to provide a supply voltage; and
providing a DC-DC converter circuit having an input electrically coupled to the charge supply battery and an output electrically coupled to the booster battery;
wherein the charge supply battery is of a different type and construction than the booster battery,
wherein the charge supply battery has a nominal voltage lower than that of the booster battery, and
wherein the charge supply battery provides a charge to the booster battery via the DC-DC converter circuit to increase a life of the booster battery by preventing self discharge of the booster battery.

86. The method of claim 85 wherein providing the charge supply comprises providing a single cell battery.

87. The method of claim 85 wherein providing the charge supply battery comprises providing a "D" cell alkaline battery.

88. The method of claim 85 further comprising providing battery charging circuitry configured to charge a vehicle battery.

89. The method of claim 88 wherein the battery charging circuitry is further configured to charge the booster battery.

90. The method of claim 88 further comprising coupling the battery charging circuitry to the vehicle battery through a four point Kelvin connection.

91. The method of claim 85 further comprising providing battery testing circuitry configured to test a vehicle battery.

92. The method of claim 91 wherein the battery testing circuitry is further configured to test the booster battery.

93. The method of claim 91 further comprising coupling the battery testing circuitry to the vehicle battery through a four point Kelvin connection.

94. The method of claim 85 wherein the booster battery is a Thin Metal film lead acid battery and the charge supply battery is an alkaline battery.

95. The method of claim 85 wherein the booster battery is a carbon battery and the charge supply battery is an alkaline battery.

* * * * *